United States Patent
Ma

(10) Patent No.: US 10,761,723 B2
(45) Date of Patent: Sep. 1, 2020

(54) METHOD FOR DISPLAYING VIRTUAL KEYBOARD ON MOBILE TERMINAL, AND MOBILE TERMINAL

(71) Applicant: Samsung Electronics Co., Ltd., Suwon-si, Gyeonggi-do (KR)

(72) Inventor: Zhen Ma, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 656 days.

(21) Appl. No.: 15/155,587

(22) Filed: May 16, 2016

(65) Prior Publication Data

US 2016/0259548 A1 Sep. 8, 2016

Related U.S. Application Data

(63) Continuation of application No. PCT/KR2014/011107, filed on Nov. 19, 2014.

(30) Foreign Application Priority Data

Nov. 19, 2013 (CN) .......................... 2013 1 0586425

(51) Int. Cl.
*G06F 3/0488* (2013.01)
*G06F 1/16* (2006.01)
*G01C 9/02* (2006.01)
*G01M 1/12* (2006.01)

(52) U.S. Cl.
CPC ........... *G06F 3/04886* (2013.01); *G01C 9/02* (2013.01); *G01M 1/122* (2013.01); *G06F 1/1626* (2013.01); *G06F 2200/1637* (2013.01)

(58) Field of Classification Search
CPC ............... G06F 3/04886; G06F 1/1626; G06F 2200/1637; G01C 9/02; G01M 1/122
See application file for complete search history.

(56) References Cited

U.S. PATENT DOCUMENTS

| 7,715,804 | B2 | 5/2010 | Moon et al. | |
|---|---|---|---|---|
| 8,633,901 | B2* | 1/2014 | Orr | G06F 3/0414 345/173 |
| 2010/0064536 | A1* | 3/2010 | Caskey | G06F 1/1677 33/303 |
| 2010/0171691 | A1 | 7/2010 | Cook et al. | |
| 2010/0177035 | A1 | 7/2010 | Schowengerdt et al. | |
| 2010/0265181 | A1* | 10/2010 | Shore | G06F 3/0237 345/168 |

(Continued)

FOREIGN PATENT DOCUMENTS

| CN | 101853136 A | 10/2010 |
|---|---|---|
| CN | 102117170 A | 7/2011 |

(Continued)

*Primary Examiner* — Jennifer N To
*Assistant Examiner* — Ashley M Fortino
(74) *Attorney, Agent, or Firm* — Jefferson IP Law, LLP

(57) ABSTRACT

A mobile terminal displaying a virtual keyboard obtains a direction in which a mobile terminal is inclined and displays a modified virtual keyboard in correspondence to the obtained inclination direction. The virtual keyboard comprises a plurality of virtual keyboard regions. The mobile terminal displays the virtual keyboard in which at least one of the plurality of virtual keyboard regions is enlarged and other non-enlarged virtual keyboard regions are reduced based on the obtained inclination direction.

18 Claims, 16 Drawing Sheets

(56) References Cited

U.S. PATENT DOCUMENTS

| | | | |
|---|---|---|---|
| 2011/0242138 A1 | 10/2011 | Tribble | |
| 2012/0162078 A1* | 6/2012 | Ferren | G06F 3/04886 345/168 |
| 2012/0194679 A1* | 8/2012 | Nehowig | G06F 1/1626 348/148 |
| 2012/0272175 A1* | 10/2012 | Lin | G06F 3/0487 715/773 |
| 2014/0152575 A1* | 6/2014 | Joe | G06F 3/023 345/169 |
| 2014/0184504 A1* | 7/2014 | Yang | G06F 1/1684 345/158 |
| 2015/0095828 A1 | 4/2015 | Iida | |
| 2016/0188181 A1* | 6/2016 | Smith | G06F 3/048 715/765 |

FOREIGN PATENT DOCUMENTS

| | | |
|---|---|---|
| CN | 102467330 A | 5/2012 |
| KR | 10-2012-0034513 A | 4/2012 |
| KR | 10-2013-0030236 A | 3/2013 |
| KR | 10-1292050 B1 | 8/2013 |
| WO | 2013/168358 A1 | 11/2013 |

\* cited by examiner

METHOD FOR DISPLAYING VIRTUAL KEYBOARD ON MOBILE TERMINAL, AND MOBILE TERMINAL

CROSS-REFERENCE TO RELATED APPLICATION(S)

This application is a continuation application, claiming the benefit under § 365(c), of an International application filed on Nov. 19, 2014 and assigned application number PCT/KR2014/011107, which claimed the benefit of a Chinese patent application filed on Nov. 19, 2013 in the Chinese Patent Office and assigned Serial number 201310586425.0, the entire disclosure of which is hereby incorporated by reference.

TECHNICAL FIELD

The present invention relates to communication technologies, and more particularly, to a mobile terminal for displaying a virtual keyboard and a method of displaying the virtual keyboard in the mobile terminal.

BACKGROUND ART

As mobile terminals become more widely available in all fields of life, they are used to perform more and more text input tasks. Thus, a touch input based on a virtual keyboard has become a major input mode on mobile terminals.

Currently, a full keyboard input based on 26 letter keys has become a mainstream way of inputting via a virtual-keyboard on most mobile terminals. A QWERT keyboard of which a first line of keys begins with letters "Q, W, E, R, T", also called a full key board, was originally invented for typewriters and then taken as a standard for computer keyboard layouts used commonly today. Now, the QWERT keyboard has been applied to not only computers but also to mobile terminals like smart phones, tablets and the like.

The QWERT full keyboard accepts a traditional PC keyboard layout, is close to a traditional usage habit of a user, and has a particular advantage in terms of English input.

Because a phone has a smaller screen, space for the virtual keyboard is limited, an arrangement of virtual keys is relatively dense and crowded, and key size is relatively small, which leads to a situation whereby a user often makes a mistake due to a difficulty in touching a target position during an input process, so that input efficiency is reduced, and such an issue is especially evident in a vertical screen input mode.

A present QWERT full keyboard occupies a larger space on a phone screen and blocks a substantial part of the screen, which has adversely affects reading of current screen information as the user types.

SUMMARY

A mobile terminal for displaying a virtual keyboard and a method of displaying the virtual keyboard in the mobile terminal are provided. A non-transitory computer readable recording medium having embodied thereon a computer program for executing the method is also provided. The technical problems solved by the present invention are not limited to those described above. Other technical problems may be derived from the embodiments below.

A method of displaying a virtual keyboard performed by a mobile terminal includes obtaining a direction in which the mobile terminal is inclined; and displaying a modified virtual keyboard in correspondence to the obtained inclination direction, wherein the virtual keyboard includes a plurality of virtual keyboard regions, and wherein the displaying of the modified virtual keyboard includes: displaying the virtual keyboard in which at least one of the plurality of virtual keyboard regions is enlarged and other non-enlarged virtual keyboard regions are reduced based on the obtained inclination direction.

In a mobile terminal that displays a virtual keyboard, the mobile terminal may display the virtual keyboard in which a region that is to be touched by a user is enlarged, and thus touch input errors by the user may be reduced. The mobile terminal may reduce a whole area of the displayed virtual keyboard, and thus, space for displaying content may be further secured and more contents may be provided to the user at one time. An input mode of the virtual keyboard displayed in the mobile terminal may be quickly switched to another mode.

DETAILED DESCRIPTION

Figure 1:
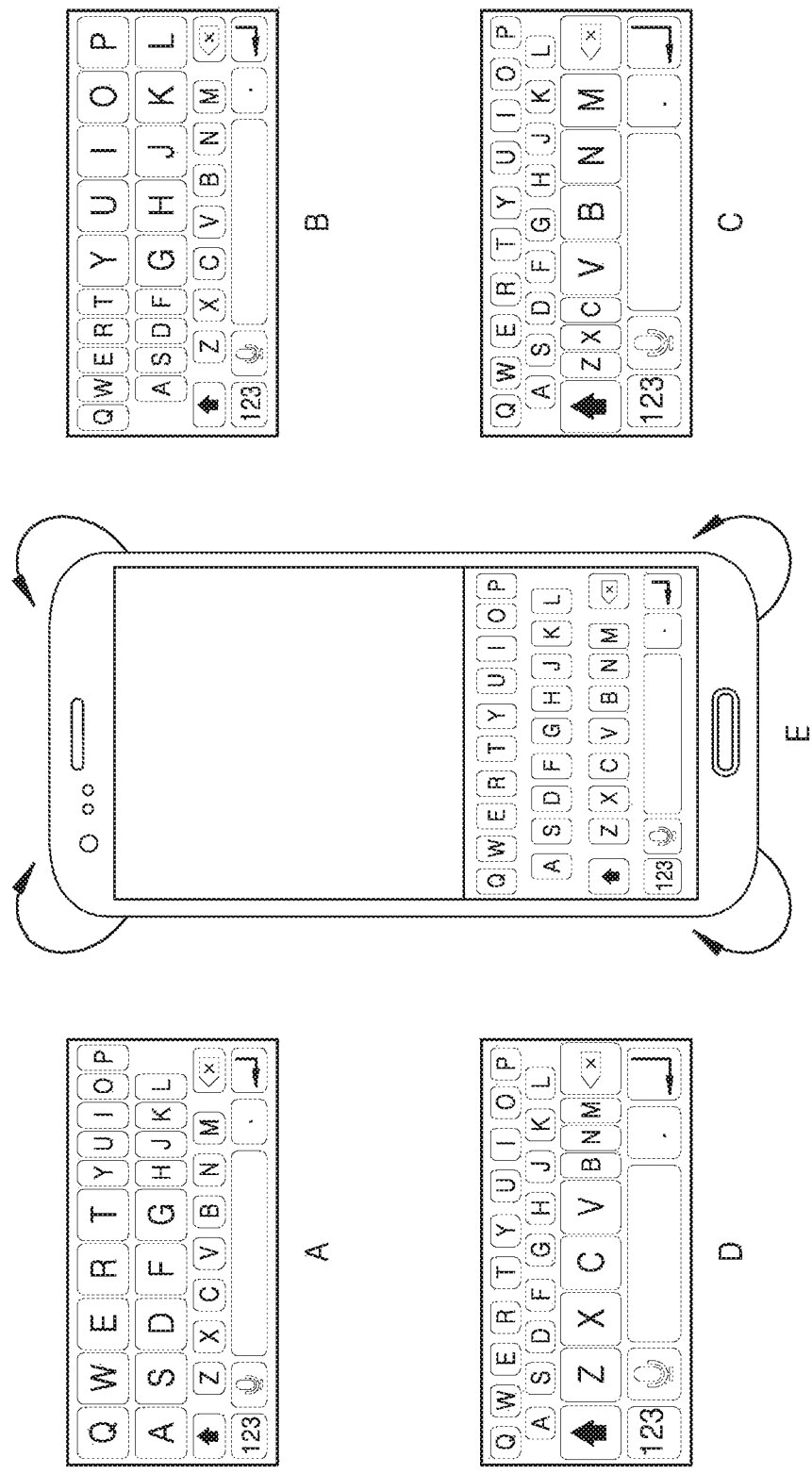
FIG. 1 is a diagram for describing a method in which a mobile terminal displays a virtual keyboard according to an embodiment of the present invention.

According to an aspect, there is provided a method including obtaining a direction in which a mobile terminal is inclined; and displaying a modified virtual keyboard in correspondence to the obtained inclination direction, wherein the virtual keyboard includes a plurality of virtual keyboard regions, and wherein the displaying of the modified virtual keyboard includes: displaying the virtual keyboard in which at least one of the plurality of virtual keyboard regions is enlarged and other non-enlarged virtual keyboard regions are reduced based on the obtained inclination direction.

The displaying of the modified virtual keyboard may include: resizing the virtual keyboard based on the obtained inclination direction.

The displaying of the modified virtual keyboard may include: differently displaying transparency of at least one of the plurality of virtual keyboard regions and transparency of other virtual keyboard regions based on the obtained inclination direction.

The displaying of the modified virtual keyboard may include: differently displaying a color of at least one of the plurality of virtual keyboard regions and colors of other virtual keyboard regions based on the obtained inclination direction.

The method may further include: obtaining acceleration information of the mobile terminal; and determining a mode of the virtual keyboard based on the obtained acceleration information, wherein the displaying of the modified virtual keyboard includes: displaying the virtual keyboard corresponding to the determined mode.

The determining of the mode of the virtual keyboard may include: determining whether acceleration of the mobile terminal measured based on the obtained acceleration information exceeds a threshold value; and when the measured acceleration exceeds the threshold value, changing a current mode of the virtual keyboard.

The changing of the current mode of the virtual keyboard may include: determining the mode of the virtual keyboard based on the measured acceleration and the obtained inclination direction.

The displaying of the modified virtual keyboard may include: selecting and displaying one of a plurality of virtual keyboards having different input modes according to the determined mode of the virtual keyboard.

The obtaining of the inclination direction in which the mobile terminal is inclined may include: obtaining information about a center of mass of the mobile terminal by using a gravity sensor; determining a region where the center of mass of the mobile terminal is located based on the obtained information about the center of mass; and determining the inclination direction of the mobile terminal in correspondence to the determined region.

According to another aspect, there is provided a method including obtaining a center of mass of a mobile terminal; determining a region where the center of mass of the mobile terminal is located based on the obtained center of mass; and displaying a virtual keyboard corresponding to the determined region.

According to another aspect, there is provided a mobile terminal including a controller for obtaining a direction in which a mobile terminal is inclined; and a display for displaying a modified virtual keyboard in correspondence to the obtained inclination direction, wherein the virtual keyboard includes a plurality of virtual keyboard regions, and wherein the display displays the virtual keyboard in which at least one of the plurality of virtual keyboard regions is enlarged and other non-enlarged virtual keyboard regions are reduced based on the obtained inclination direction.

The display may resize the virtual keyboard based on the obtained inclination direction.

The display may differently display transparency of at least one of the plurality of virtual keyboard regions and transparencies of other virtual keyboard regions based on the obtained inclination direction.

The display may differently display a color of at least one of the plurality of virtual keyboard regions and colors of other virtual keyboard regions based on the obtained inclination direction.

The mobile terminal may further include: an acceleration sensor for obtaining acceleration information of the mobile terminal, wherein the controller determines a mode of the virtual keyboard based on the obtained acceleration information, and wherein the display displays the virtual keyboard corresponding to the determined mode.

The controller may determine whether acceleration of the mobile terminal measured based on the obtained acceleration information exceeds a threshold value, and, when the measured acceleration exceeds the threshold value, change a current mode of the virtual keyboard.

The display may select and display one of a plurality of virtual keyboards having different input modes according to the determined mode of the virtual keyboard.

The mobile terminal may further include: a gravity sensor for obtaining information about a center of mass of the mobile terminal, wherein the controller determines a region where the center of mass of the mobile terminal is located based on the obtained information about the center of mass and determines the inclination direction of the mobile terminal in correspondence to the determined region.

According to another aspect, there is provided a mobile terminal including a gravity sensor for obtaining a center of mass of a mobile terminal; a controller for determining a region where the center of mass of the mobile terminal is located based on the obtained center of mass; and a display for displaying a virtual keyboard corresponding to the determined region.

The embodiments will now be described more fully with reference to the accompanying drawings. For better understanding of features of the embodiments, descriptions of techniques or structures related to the present invention which would be obvious to one of ordinary skill in the art will be omitted.

FIG. 1 is a diagram for describing a method in which a mobile terminal 100 displays a virtual keyboard according to an embodiment of the present invention.

Referring to FIG. 1, the mobile terminal 100 according to an embodiment of the present invention may obtain a direction in which the mobile terminal 100 is inclined and may display the virtual keyboard corresponding to the obtained inclination direction.

More specifically, the mobile terminal 100 may display one virtual keyboard among virtual keyboards A, B, C, D, and E having different layouts according to the direction in which the mobile terminal 100 is inclined.

For example, when the mobile terminal 100 is inclined such that a location of an apex (a left upper end) where a left side corner of the mobile terminal 100 and an upper end corner meet rises, the mobile terminal 100 may display the virtual keyboard A in which regions of buttons "Q, W, E, R, T, A, S, D, F and G" are enlarged and regions of other buttons are reduced. When the mobile terminal 100 is inclined such that a location of a right upper end of the mobile terminal 100 rises, the mobile terminal 100 may display the virtual keyboard B in which regions of buttons "Y, U, I, O, P, G, H, J, K and L" are enlarged and regions of other buttons are reduced. When the mobile terminal 100 is inclined such that a location of a right lower end of the mobile terminal 100 rises, the mobile terminal 100 may display the virtual keyboard C in which regions of buttons "V, B, N and M", a "right function key", and a "space bar" are enlarged and regions of other buttons are reduced. When the mobile terminal 100 is inclined such that a location of a left lower end of the mobile terminal 100 rises, the mobile terminal 100 may display the virtual keyboard C in which regions of buttons "Z, X, C and V", a "left function key", and the "space bar" are enlarged and regions of other buttons are reduced.

When the mobile terminal 100 is not inclined in any direction, the mobile terminal 100 may display the virtual keyboard E that is a general virtual keyboard form. The virtual keyboard E may be a system default virtual keyboard.

The mobile terminal 100 may obtain the direction in which the mobile terminal 100 is inclined in real time and may dynamically display different virtual keyboards when the obtained inclination direction is changed.

Figure 2:
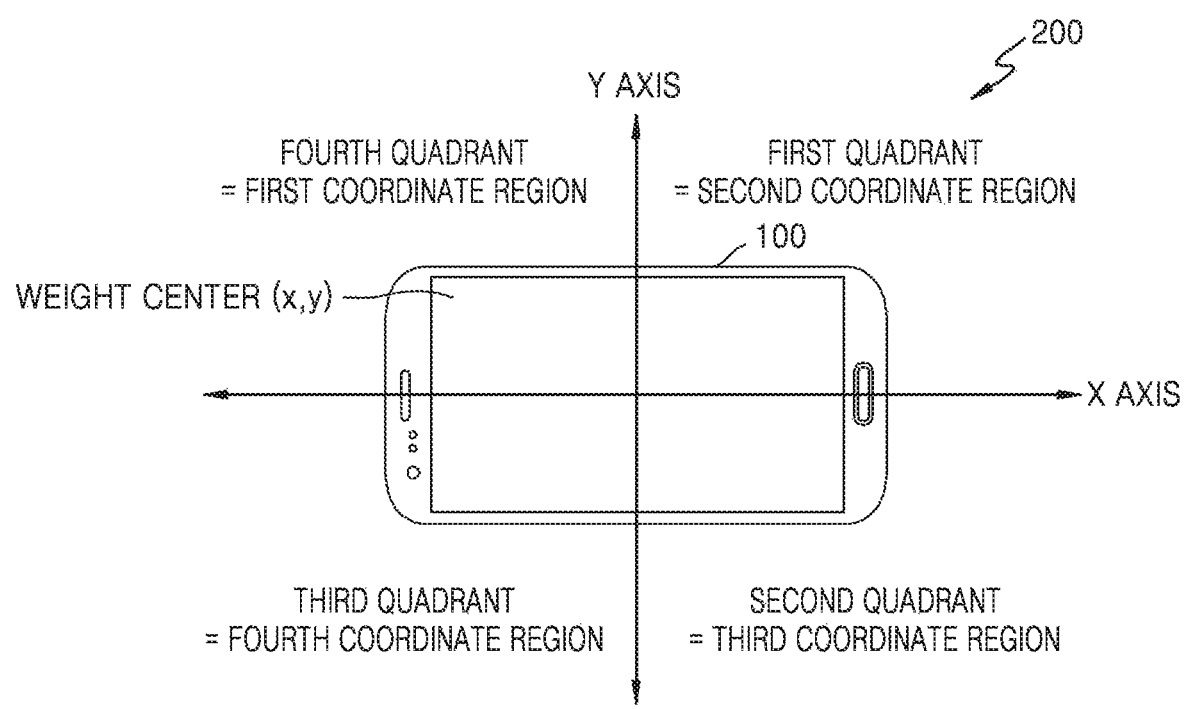
FIG. 2 is a diagram illustrating a coordinate system configured in relation to a mobile terminal according to an embodiment of the present invention.

FIG. 2 is a diagram illustrating a coordinate system 200 configured in relation to the mobile terminal 100 according to an embodiment of the present invention.

The mobile terminal 100 may configure the coordinate system 200 with an origin at a center of the mobile terminal 100 to determine a direction in which the mobile terminal 100 is inclined.

Referring to FIG. 2, the coordinate system 200 may be configured as a 2D plane having an X axis parallel to an upper end corner of a screen of the mobile terminal 100 and a Y axis parallel to a side corner of the screen thereof. The coordinate system 200 may also be configured as a 3D space having the X axis, the Y axis, and a Z axis.

More specifically, the mobile terminal 100 may measure a center of mass of the mobile terminal 100 to obtain the direction in which the mobile terminal 100 is inclined. The mobile terminal 100 may use a gravity sensor included in the mobile terminal 100 to obtain information regarding the center of mass of the mobile terminal 100 and measure the center of mass of the mobile terminal 100 and determine the inclination direction of the mobile terminal 100 based on the measured center of mass.

The mobile terminal 100 may configure the coordinate system 200 with the origin at the center of the mobile terminal 100 to split the coordinate system 200 into a plurality of coordinate regions. The mobile terminal 100 may determine a coordinate region where the center of mass of the mobile terminal 100 is located among the plurality of coordinate regions. The mobile terminal 100 may determine the inclination direction of the mobile terminal 100 in correspondence to the determined coordinate region.

For example, the mobile terminal 100 may configure the coordinate system 200 as the 2D plane having the X axis and the Y axis and may split the coordinate system 200 into four coordinate regions. The mobile terminal 100 may configure a fourth quadrant of the coordinate system 200 as a first coordinate region, a first quadrant as a second coordinate region, a second quadrant as a third coordinate region, and a third quadrant as a fourth coordinate region.

To split the coordinate system 200 into the plurality of coordinate regions, the mobile terminal 100 may configure a plurality of threshold values that are references for splitting the coordinate system 200. For example, the mobile terminal 100 may configure a first threshold value as "X=0" and a second threshold value as "Y=0".

The mobile terminal 100 may compare an X value and a Y value of a coordinate of the measured center of mass of the mobile terminal 100 with the first threshold value and the second threshold value to determine a coordinate region where the center of mass is located. For example, when the mobile terminal 100 is inclined such that a location of a right lower end of the mobile terminal 100 rises, the mobile terminal 100 may measure the coordinate of the center of mass of the mobile terminal 100 as (−5, 5). When the measured coordinate of the center of mass of the mobile terminal 100 is (−5, 5), the mobile terminal 100 may compare the X value "−5" of the coordinate of the center of mass with the first threshold value "0" and compare the Y value "5" of the coordinate of the center of mass with the second threshold value "0" to determine the coordinate region where the w center of mass is located. Since the X value of the coordinate of the center of mass is smaller than the first threshold value, and the Y value of the coordinate of the center of mass is greater than the second threshold value, the coordinate of the center of mass belongs to the fourth quadrant, and thus mobile terminal 100 may determine the coordinate region where the center of mass is located as the first coordinate region.

When the measured coordinate of the center of mass of the mobile terminal 100 belongs to the fourth quadrant, the mobile terminal 100 may determine the coordinate region where the center of mass is located as the first coordinate region and the inclination direction of the mobile terminal 100 as the right lower end in correspondence to the first coordinate region.

The mobile terminal 100 may receive the inclination direction of the mobile terminal 100 from an external device but not limited thereto and may obtain the inclination direction of the mobile terminal 100 in real time in various ways.

If the inclination direction of the mobile terminal 100 is obtained, the mobile terminal 100 may display a virtual keyboard corresponding to the obtained inclination direction of the mobile terminal 10.

Figure 3:
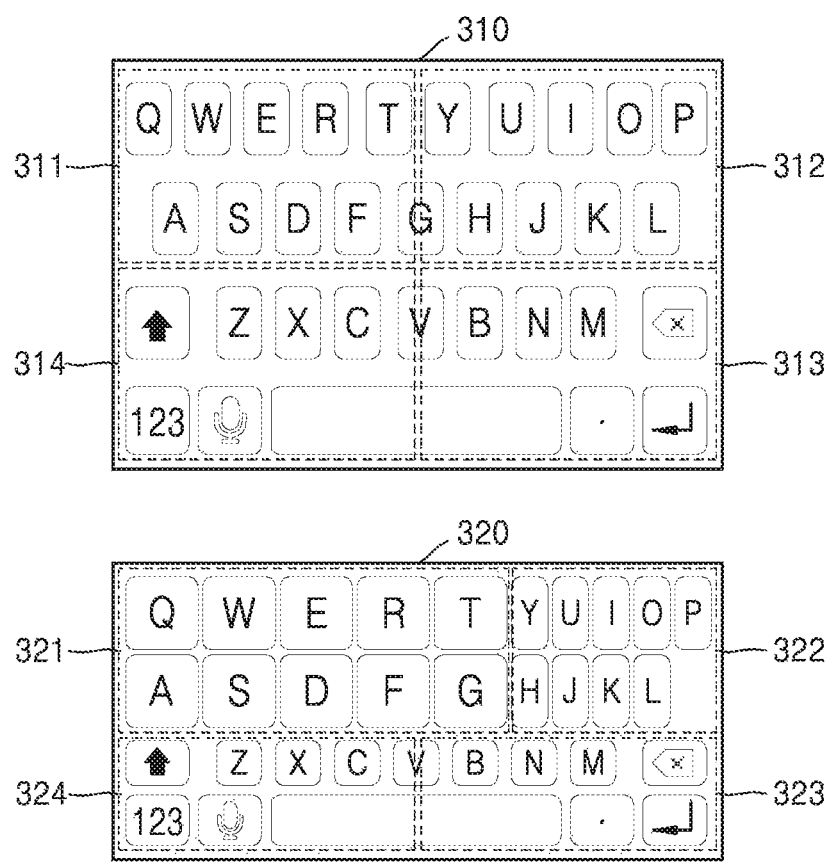
FIG. 3 is a diagram illustrating virtual keyboards that are split into a plurality of virtual keyboard regions.

FIG. 3 is a diagram illustrating virtual keyboards that are split into a plurality of virtual keyboard regions.

The mobile terminal 100 may display one of virtual keyboards having different layouts according to a direction in which the mobile terminal 100 is inclined. In FIG. 3, a virtual keyboard 310 may be a default virtual keyboard, and a virtual keyboard 320 may be a virtual keyboard having a modified layout when the mobile terminal 100 is inclined.

Referring to FIG. 3, the mobile terminal 100 may split the virtual keyboards that are to be displayed into the plurality of virtual keyboard regions. For example, the mobile terminal 100 may split the virtual keyboard 310 into a first keyboard region 311, a second keyboard region 312, a third keyboard region 313, and a fourth keyboard region 314. The first keyboard region 311 may include buttons "Q, W, E, R, T, A, S, D, F and G". The second keyboard region 312 may include buttons "Y, U, I, O, P, G, H, J. K and L". The third keyboard region 313 may include buttons "V, B, N and M", a "right function key", and a "space bar". The fourth keyboard region 314 may include buttons "Z, X, C and V", a "left function key", and the "space bar".

The mobile terminal 100 may display the virtual keyboard 320 in which at least one of the plurality of keyboard regions 311, 312, 313, and 314 is enlarged according to the direction in which the mobile terminal 100 is inclined. More specifically, the mobile terminal 100 may select at least one of a plurality of keyboard regions based on the obtained inclination direction and may display a virtual keyboard in which the selected keyboard region is enlarged.

For example, when a coordinate region to which a center of mass of the mobile terminal 100 belongs is determined as a third coordinate region and thus the inclination direction is determined as a left upper end, the mobile terminal 100 may display the virtual keyboard 320 corresponding to the third coordinate region. The mobile terminal 100 may select the first keyboard region 311 among the plurality of keyboard regions 311, 312, 313, and 314 based on the determined third coordinate region and may display the virtual keyboard 320 in which the selected first keyboard region 311 is enlarged. For example, the mobile terminal 100 may display the virtual keyboard 320 including an enlarged first keyboard region 321.

Alternatively, the mobile terminal 100 may display a virtual keyboard in which a keyboard region is enlarged in an opposite direction of the inclination direction of the mobile terminal 10. For example, when the mobile terminal 100 is inclined such that a location of the left upper end of the mobile terminal 100 rises and thus the coordinate region to which the center of mass of the mobile terminal 100 belongs is determined as the third coordinate region and thus the inclination direction is determined as the left upper end, the mobile terminal 100 may select the third virtual keyboard 313 among the plurality of keyboard regions 311, 312, 313, and 314 based on the determined third coordinate region and may display the virtual keyboard 310 in which the selected third keyboard region 313 is enlarged.

The mobile terminal 100 may also display the virtual keyboard 320 in which at least one of the plurality of virtual keyboard regions 311, 312, 313, and 314 is reduced according to the direction in which the mobile terminal 100 is inclined. More specifically, the mobile terminal 100 may select at least one of a plurality of virtual keyboard regions based on the obtained inclination direction and may display a virtual keyboard in which non-selected virtual keyboard regions are reduced among the plurality of virtual keyboard regions. The mobile terminal 100 may display a virtual keyboard in which at least one of the plurality of virtual keyboard regions is enlarged and other non-enlarged virtual keyboard regions are reduced based on the obtained inclination direction.

The mobile terminal 100 may display a virtual keyboard in which the non-selected virtual keyboard regions among the plurality of virtual keyboard regions are unlimitedly reduced and no longer appear.

For example, when the mobile terminal 100 is inclined such that the location of the left upper end of the mobile terminal 100 rises and thus the coordinate region to which the center of mass of the mobile terminal 100 belongs is determined as the third coordinate region, the mobile terminal 100 may display the virtual keyboard 320 in which the second keyboard region 312, the third keyboard region 313, and the fourth keyboard region 314 are reduced as a virtual keyboard corresponding to the third coordinate region. Alternatively, the mobile terminal 100 may display a virtual keyboard in which the second keyboard region 312, the third keyboard region 313, and the fourth keyboard region 314 do not appear. The mobile terminal 100 may select the first keyboard region 311 among the plurality of keyboard regions 311, 312, 313, and 314 based on the determined third coordinate region and may display the virtual keyboard 320 in which the second keyboard region 312, the third keyboard region 313, and the fourth keyboard region 314 that are not selected are reduced. For example, the mobile terminal 100 may display the virtual keyboard 320 including reduced second keyboard region 322, third keyboard region 323, and fourth keyboard region 324.

That is, the mobile terminal 100 may display the virtual keyboard 320 in which the first keyboard region 311 is enlarged, and the second keyboard region 312, the third keyboard region 313, and the fourth keyboard region 314 are reduced as the virtual keyboard corresponding to the third coordinate region.

The mobile terminal 100 may display a virtual keyboard in which a selected keyboard region is enlarged and other non-selected keyboard regions are reduced, thereby reducing an area of the virtual keyboard compared to an area of a default keyboard.

For example, an area of the virtual keyboard 320 may be smaller than an area of the default virtual keyboard 310. A length of the virtual keyboard 320 may be the same as that of the default virtual keyboard 310, and a height thereof may be smaller than that of the default virtual keyboard 310. According to a specific implementation, the height of the virtual keyboard 320 that is reduced compared to the default virtual keyboard 310 may be determined according to an increase in an area of a first keyboard region and a reduction in an area of regions other than the first keyboard region.

Therefore, a vertical virtual keyboard displayed on a vertical screen may have a reduced height, thereby further securing space for displaying content other than the virtual keyboard.

Figure 4:
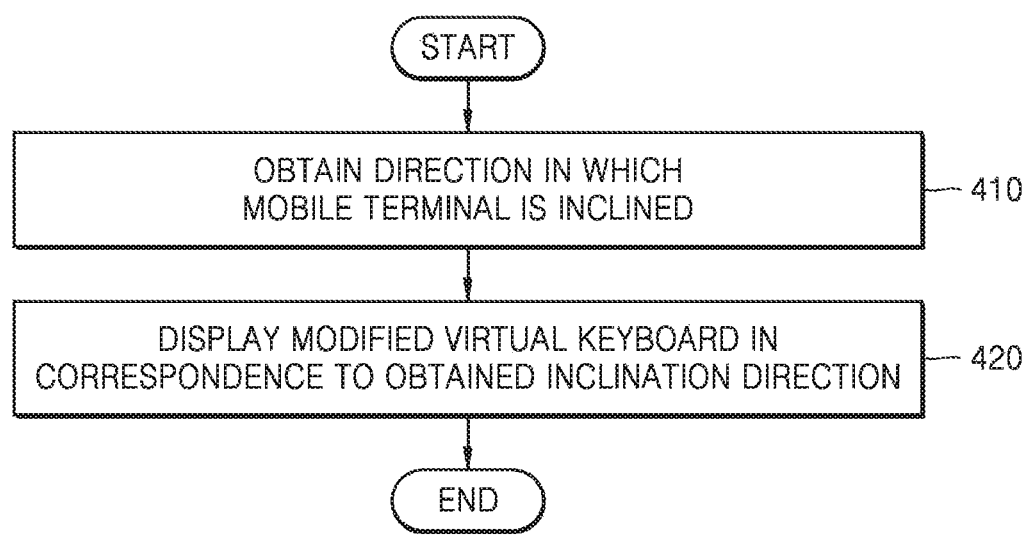
FIG. 4 illustrates a flowchart of a method in which a mobile terminal displays a virtual keyboard according to an embodiment of the present invention.

FIG. 4 illustrates a flowchart of a method in which the mobile terminal 100 displays a virtual keyboard according to an embodiment of the present invention.

Referring to FIG. 4, in operation S410, the mobile terminal 100 may obtain a direction in which the mobile terminal 100 is inclined.

The mobile terminal 100 may obtain the inclination direction of the mobile terminal 100 by using a gravity sensor included in the mobile terminal 100. More specifically, the mobile terminal 100 may use the gravity sensor to obtain information regarding a center of mass of the mobile terminal 100 and measure the center of mass of the mobile terminal 100 and determine the inclination direction of the mobile terminal 100 based on the measured center of mass.

For example, the mobile terminal 100 may determine a coordinate region where the measured center of mass of the mobile terminal 100 in a coordinate system with an origin at a center of the mobile terminal 100 is located. The mobile terminal 100 may compare an X value and a Y value of a coordinate of the measured center of mass of the mobile terminal 100 with threshold values to determine the coordinate region where the center of mass is located. The mobile terminal 100 may determine the inclination direction of the mobile terminal 100 in correspondence to the determined coordinate region.

The mobile terminal 100 may receive the inclination direction of the mobile terminal 100 from an external device but not limited thereto and may obtain the inclination direction of the mobile terminal 100 in real time in various ways.

In operation S420, the mobile terminal 100 may display a virtual keyboard corresponding to the obtained inclination direction of the mobile terminal 10.

The mobile terminal 100 may split the virtual keyboard that is to be displayed into a plurality of keyboard regions. For example, the mobile terminal 100 may split the virtual keyboard into a first keyboard region, a second keyboard region, a third keyboard region, and a fourth keyboard region. The first keyboard region may include buttons "Q, W, E, R, T, A, S, D, F and G". The second keyboard region may include buttons "Y, U, I, O, P, G, H, J, K and L". The third keyboard region may include buttons "V, B, N and M", a "right function key", and a "space bar". The fourth keyboard region may include buttons "Z, X, C and V", a "left function key", and the "space bar".

The mobile terminal 100 may display a virtual keyboard in which at least one of the plurality of keyboard regions is enlarged according to the direction in which the mobile terminal 100 is inclined. More specifically, the mobile terminal 100 may select at least one of the plurality of keyboard regions based on the obtained inclination direction and may display a virtual keyboard in which the selected keyboard region is enlarged.

For example, when the mobile terminal 100 is inclined such that a location of a left upper end of the mobile terminal 100 rises and thus a coordinate region to which the center of mass of the mobile terminal 100 belongs is determined as a third coordinate region, the mobile terminal 100 may select the first keyboard region among the plurality of keyboard regions based on the determined third coordinate region and may display the virtual keyboard in which the selected first keyboard region including the buttons "Q, W, E, R, T, A, S, D, F and G" is enlarged.

Alternatively, the mobile terminal 100 may display a virtual keyboard in which a keyboard region is enlarged in an opposite direction of the inclination direction of the mobile terminal 10. For example, when the coordinate region to which the center of mass of the mobile terminal 100 belongs is determined as the third coordinate region, the mobile terminal 100 may select the third virtual keyboard among the plurality of keyboard regions based on the determined third coordinate region and may display the virtual keyboard in which the selected third keyboard region including the buttons "V, B, N and M", the "right function key", and the "space bar" is enlarged.

The mobile terminal 100 may also display a virtual keyboard in which at least one of the plurality of keyboard regions is reduced according to the direction in which the mobile terminal 100 is inclined. More specifically, the mobile terminal 100 may select at least one of a plurality of virtual keyboard regions based on the obtained inclination direction and may display a virtual keyboard in which non-selected virtual keyboard regions are reduced among the plurality of virtual keyboard regions.

For example, when the coordinate region to which the center of mass of the mobile terminal 100 belongs is determined as the third coordinate region, the mobile terminal 100 may select the first keyboard region among the plurality of keyboard regions based on the determined third coordinate region and may display a virtual keyboard in which the second keyboard region, the third keyboard region, and the fourth keyboard region that are not selected are reduced. Alternatively, the mobile terminal 100 may display a virtual keyboard in which the second keyboard region, the third keyboard region, and the fourth keyboard region that are not selected no longer appear.

That is, the mobile terminal 100 may display the virtual keyboard in which the first keyboard region is enlarged, and the second keyboard region, the third keyboard region, and the fourth keyboard region are reduced as a virtual keyboard corresponding to the third coordinate region.

For example, the mobile terminal 100 may display a virtual keyboard in which the selected first keyboard region including the buttons "Q, W, E, R, T, A, S, D, F and G" is enlarged, and the second keyboard region including the buttons "Y, U, I, O, P, G, H, J, K and L", the third keyboard region including the V, B, N and M", the "right function key", and the "space bar", and the fourth keyboard region including the buttons "Z, X, C and V", the "left function key", and the "space bar" that are not selected are reduced.

The mobile terminal 100 may display a virtual keyboard in which a selected keyboard region is enlarged and other non-selected keyboard regions are reduced, thereby reducing an area of the virtual keyboard compared to an area of a default keyboard. Thus, the mobile terminal 100 may further secure space for displaying content other than the virtual keyboard, thereby improving user convenience.

The mobile terminal 100 may display one of a plurality of virtual keyboards having different virtual keyboard modes according to the direction in which the mobile terminal 100 is inclined.

A mode of a virtual keyboard means an input type of the virtual keyboard. For example, the mobile terminal 100 may display a virtual keyboard having a character mode, a number mode, a symbol mode, or an emoticon mode. The character mode may include a Korean character mode, an English mode, etc.

The mobile terminal 100 may configure a plurality of virtual keyboard modes in correspondence to the inclination direction of the mobile terminal 100. More specifically, the mobile terminal 100 may select one virtual keyboard mode corresponding to the obtained inclination direction from among the plurality of virtual keyboard modes and may display a virtual keyboard corresponding to the selected virtual keyboard mode.

For example, when the coordinate region to which the center of mass of the mobile terminal 100 belongs is determined as the third coordinate region, the mobile terminal 100 may select the symbol mode from among the plurality of virtual keyboard modes based on the determined third coordinate region and may display a virtual keyboard corresponding to the symbol mode. The virtual keyboard corresponding to the symbol mode may be a symbol mode virtual keyboard and may include, for example, buttons "?, !, /, . . . , @, :, ;, &".

Figure 5A:
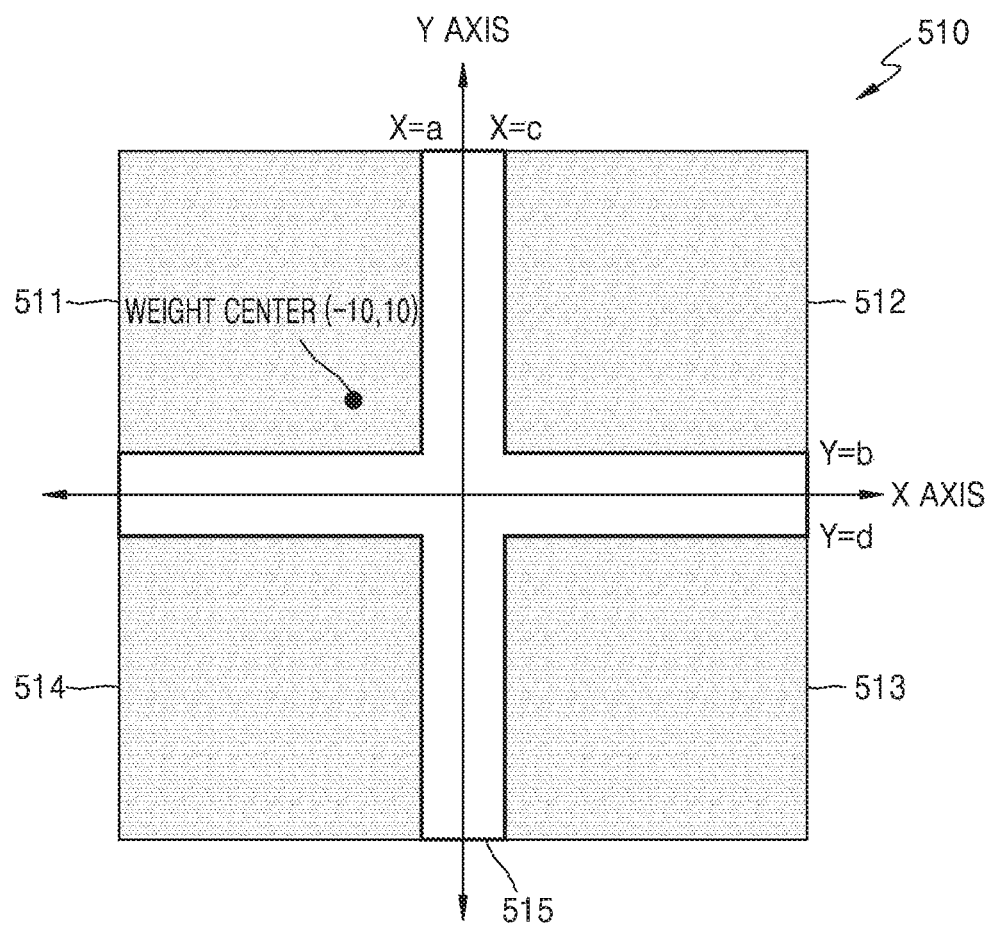
FIGS. 5A through 5C illustrate examples of the coordinate system of FIG. 2 that are split into a plurality of coordinate regions.
Figure 5B:
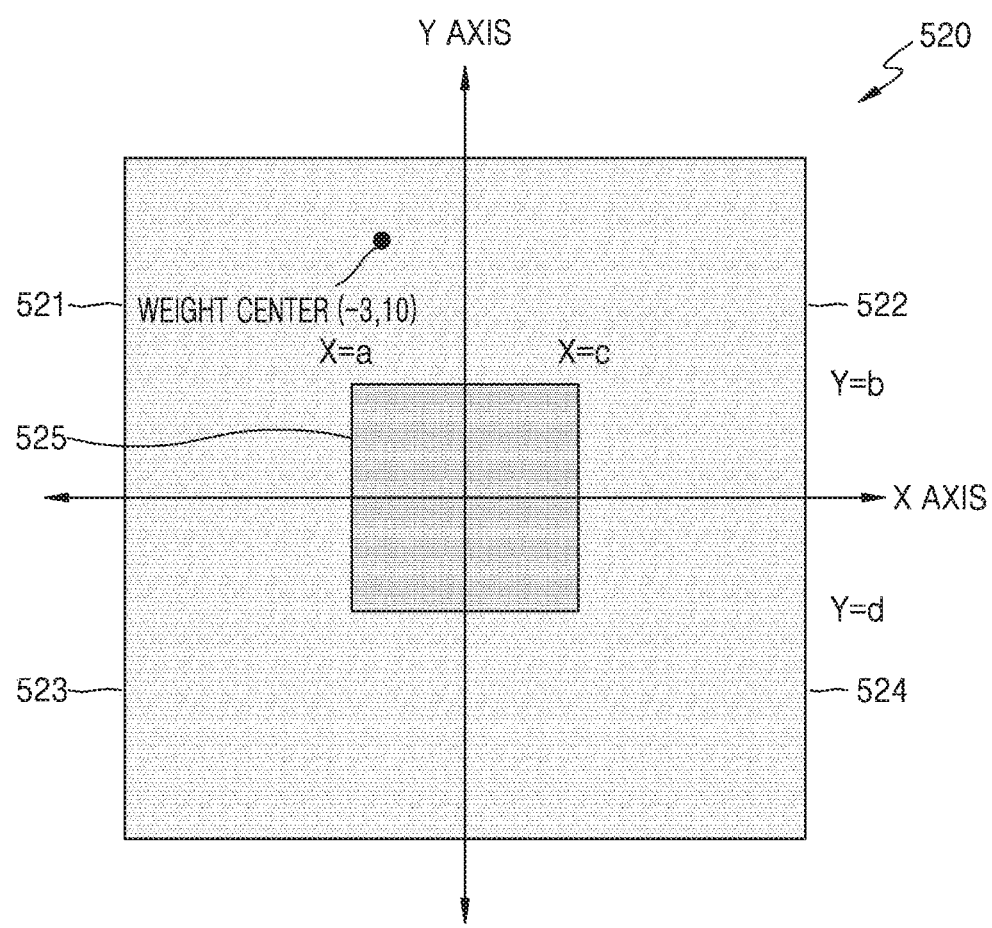
Figure 5C:
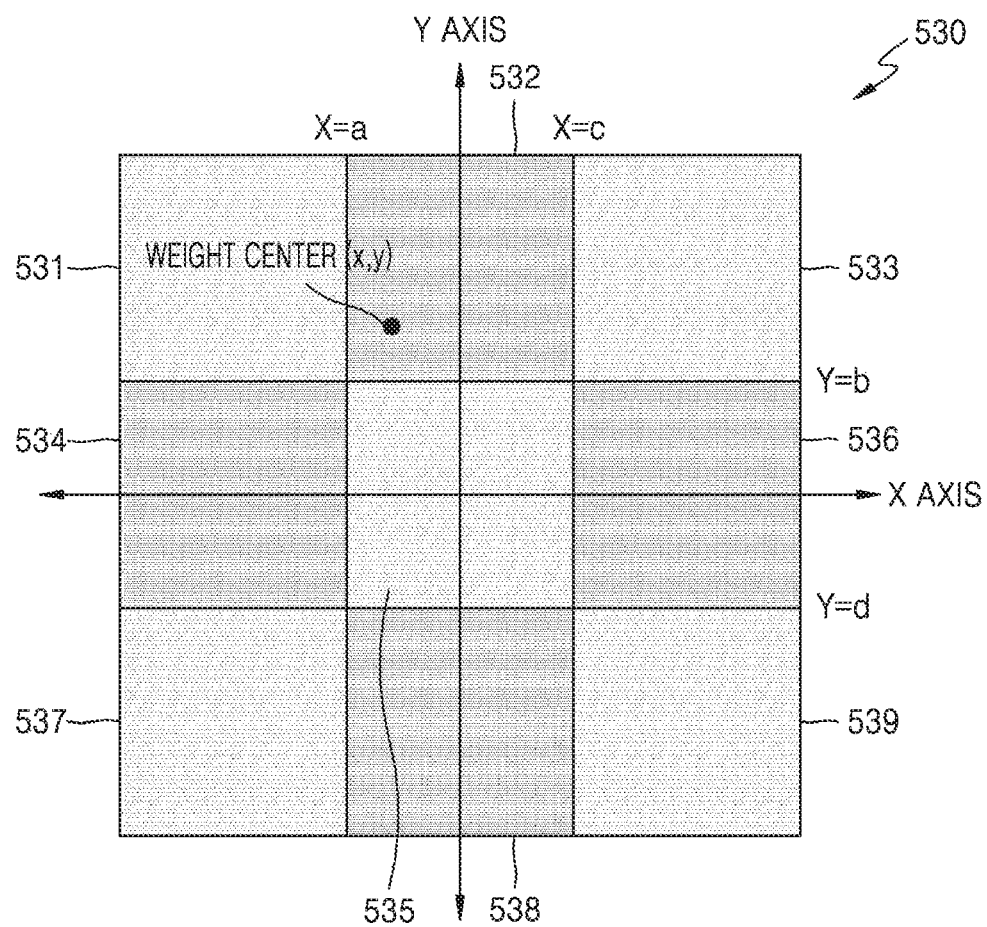

FIGS. 5A through 5C illustrate examples of the coordinate system 200 of FIG. 2 that are split into a plurality of coordinate regions.

Referring to FIG. 5A, the mobile terminal 100 may configure a coordinate system 510 as a 2D plane with an origin at a center of the mobile terminal 100 and having an X axis and a Y axis. The mobile terminal 100 may split the coordinate system 510 into a first coordinate region 511, a second coordinate region 512, a third coordinate region 513, a fourth coordinate region 514, and a fifth coordinate region 515. The mobile terminal 100 may split the coordinate system 510 in relation to a first threshold value "X=a", a second threshold value "Y=b", a third threshold value "X=c", and a fourth threshold value "Y=d". The first threshold value "a" may be smaller than the third threshold value "c". The second threshold value "b" may be greater than the fourth threshold value "d". For example, the first threshold value may be set as "X=−5", the second threshold value may be set as "Y=5", the third threshold value may be set as "X=5", and the fourth threshold value may be set as "Y=−5".

The mobile terminal 100 may obtain a center of mass of the mobile terminal 100, may compare an X value and a Y value of a coordinate of the center of mass with the threshold values, and determine a coordinate region where the center of mass of the mobile terminal 100 is located. For example, if the mobile terminal 100 is inclined such that a location of a right lower end of the mobile terminal 100 rises and the coordinate of the center of mass of the mobile terminal 100 is measured as (−10, 10), since an X coordinate "−10" of the center weight is smaller than the first threshold value "−5"

and a Y coordinate "10" of the center weight is greater than the second threshold value "5", the mobile terminal 10 may determine the coordinate region where the center of mass of the mobile terminal 100 is located as the first coordinate region 511.

When the mobile terminal 100 is not inclined in any direction and thus the center of mass of the mobile terminal 100 is determined to be located in a fifth coordinate region 515, the mobile terminal 100 may display a virtual keyboard in which any one of the plurality of keyboard regions is not enlarged or reduced. For example, a virtual keyboard corresponding to the fifth coordinate region 515 may be a default virtual keyboard.

Referring to FIG. 5B, the mobile terminal 100 may configure a coordinate system 520 as a 2D plane with an origin at a center of the mobile terminal 100 and having an X axis and a Y axis. The mobile terminal 100 may split the coordinate system 520 into a first coordinate region 521, a second coordinate region 522, a third coordinate region 523, a fourth coordinate region 524, and a fifth coordinate region 525. The mobile terminal 100 may set a first threshold value as "X=−5", a second threshold value as "Y=5", a third threshold value as "X=0", a fourth threshold value as "Y=0", a fifth threshold value as "X=5", and a sixth threshold value as "Y=5" to split the coordinate system 520.

If the coordinate of the center of mass of the mobile terminal 100 is measured as (−3, 10), since an X coordinate "−3" of the center weight is greater than the first threshold value "−5" and smaller than the third threshold value "0", and a Y coordinate "10" of the center weight is greater than the second threshold value "5", the mobile terminal 10 may determine the coordinate region where the center of mass of the mobile terminal 100 is located as the first coordinate region 521.

Referring to FIG. 5C, the mobile terminal 100 may further subdivide and split a coordinate system 530 as a 2D plane with an origin at a center of the mobile terminal 100 and having an X axis and a Y axis. For example, the mobile terminal 100 may split the coordinate system 530 into a first coordinate region 531, a second coordinate region 532, a third coordinate region 533, a fourth coordinate region 534, a fifth coordinate region 535, a sixth coordinate region 536, a seventh coordinate region 537, an eighth coordinate region 538, and a ninth coordinate region 539. The mobile terminal 100 may set a first threshold value as "X=−5", a second threshold value as "Y=5", a third threshold value as "X=5", and a fourth threshold value as "Y=−5", to split the coordinate system 520.

If the coordinate of the center of mass of the mobile terminal 100 is measured as (−3, 10), since an X coordinate "−3" of the center weight is greater than the first threshold value "−5" and smaller than the third threshold value "5", and a Y coordinate "10" of the center weight is greater than the second threshold value "5", the mobile terminal 10 may determine the coordinate region where the center of mass of the mobile terminal 100 is located as the second coordinate region 532.

The mobile terminal 100 may determine the coordinate region where the center of mass of the mobile terminal 100 is located to obtain an inclination direction of the mobile terminal 100 in correspondence to the determined region and display a virtual keyboard corresponding to the obtained inclination direction.

Figure 6A:
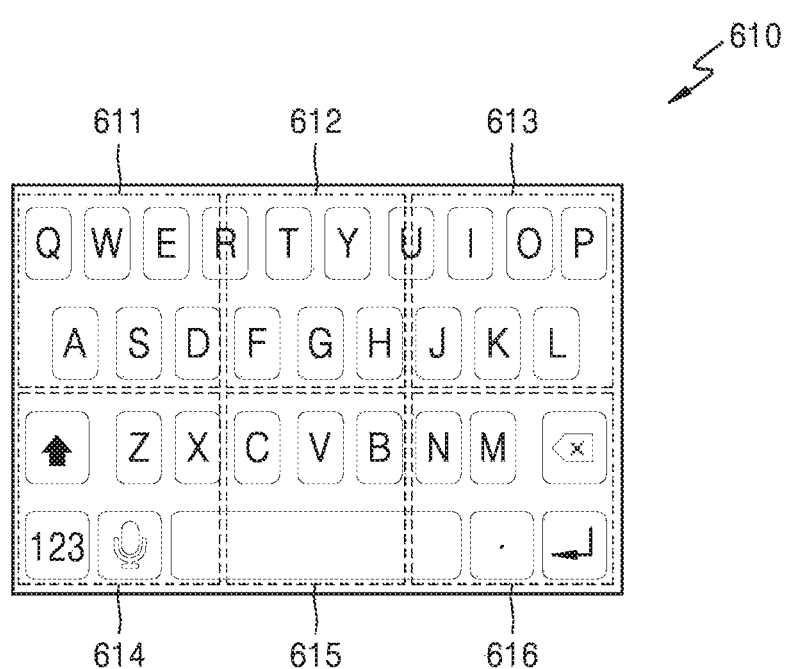
FIGS. 6A and 6B illustrate other examples of virtual keyboards that are split into a plurality of virtual keyboard regions of FIG. 3.
Figure 6B:
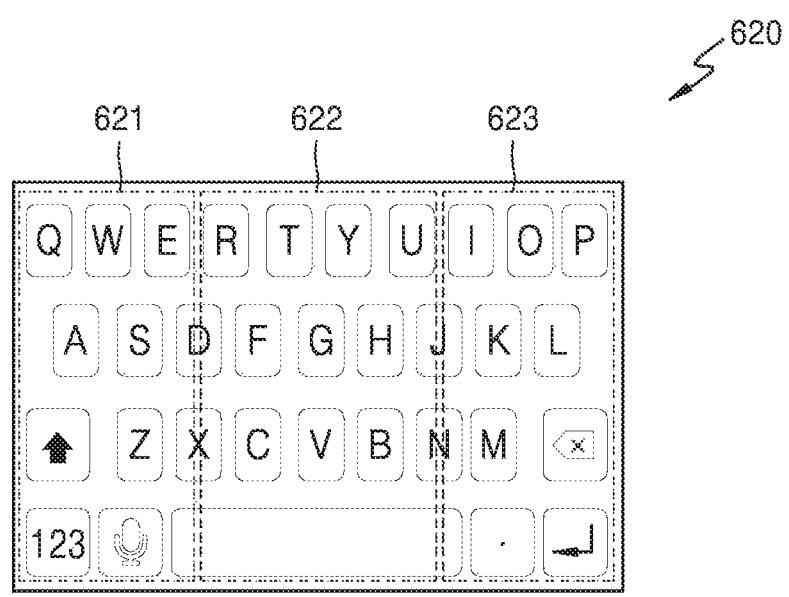

FIGS. 6A and 6B illustrate other examples of virtual keyboards that are split into a plurality of virtual keyboard regions of FIG. 3.

Referring to FIG. 6A, the mobile terminal 100 may further subdivide and split a virtual keyboard that is to be displayed into a plurality of keyboard regions. For example, the mobile terminal 100 may split the virtual keyboard 610 into a first keyboard region 611, a second keyboard region 612, a third keyboard region 613, a fourth keyboard region 614, a fifth keyboard region 615, and a sixth keyboard region 616.

Referring to FIG. 6B, the mobile terminal 100 may split a virtual keyboard 620 that is to be displayed into three keyboard regions. For example, the mobile terminal 100 may split a left region of the virtual keyboard 620 into a left keyboard region 621, a middle region of the virtual keyboard 620 into a middle keyboard region 622, and a right region of the virtual keyboard 620 into a right keyboard region 623.

When the mobile terminal 100 is inclined such that a location of a left corner of the mobile terminal 100 rises, the mobile terminal 100 may display a virtual keyboard in which the left keyboard region 621 is enlarged according to an inclination direction. Alternatively, the mobile terminal 100 may display a virtual keyboard in which the right keyboard region 623 is enlarged in an opposite direction to the inclination direction.

When the mobile terminal 100 is inclined such that a location of a right corner of the mobile terminal 100 rises, the mobile terminal 100 may display a virtual keyboard in which the right keyboard region 623 is enlarged according to the inclination direction. Alternatively, the mobile terminal 100 may display a virtual keyboard in which the left keyboard region 621 is enlarged in the opposite direction to the inclination direction.

When the mobile terminal 100 is not inclined in any direction, the mobile terminal 100 may display a virtual keyboard in which the middle keyboard region 622 is enlarged.

Figure 7:
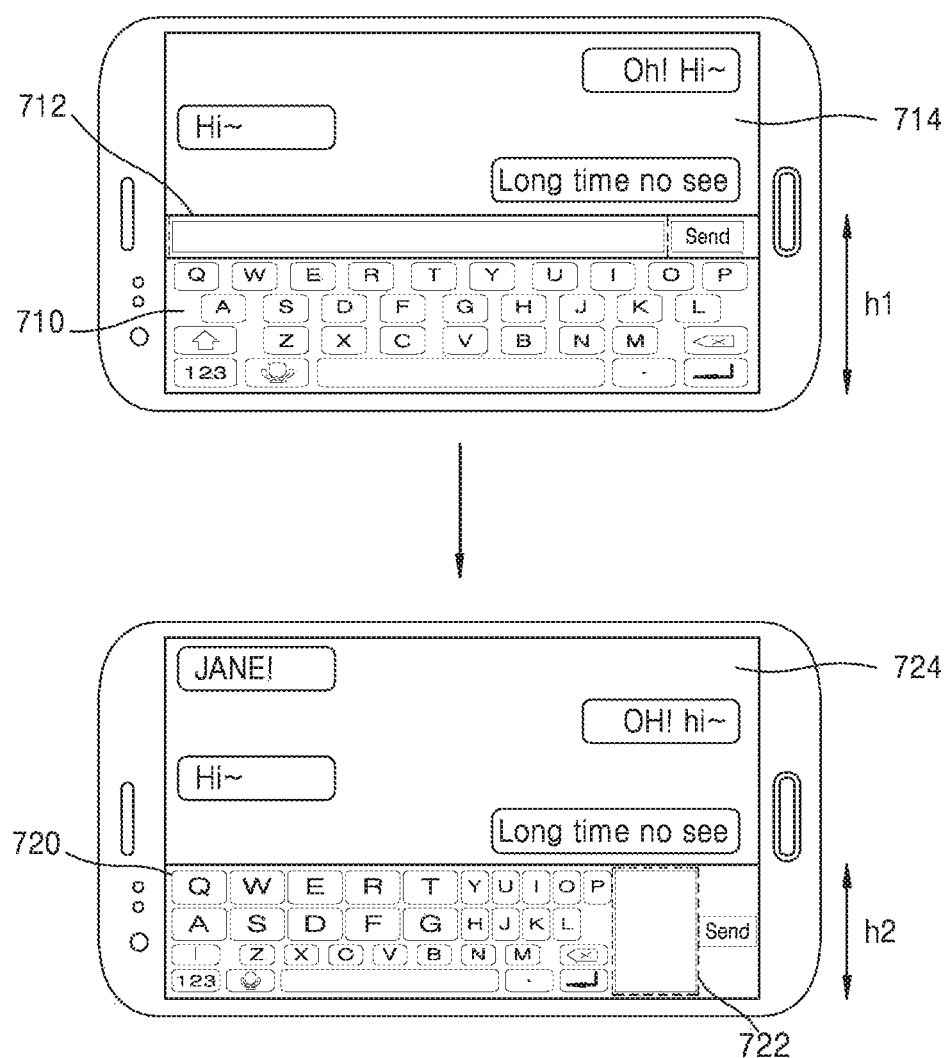
FIG. 7 is a diagram illustrating a comparison between a horizontal virtual keyboard displayed by a mobile terminal according to an embodiment of the present invention and a general horizontal virtual keyboard.

FIG. 7 is a diagram illustrating a comparison between a horizontal virtual keyboard 720 displayed by the mobile terminal 100 according to an embodiment of the present invention and a general horizontal virtual keyboard 710.

Referring to FIG. 7, when the default virtual keyboard 710 and the mobile terminal 100 are inclined, the virtual keyboard 720 having a modified layout is illustrated.

The default virtual keyboard 710 may include an input region 712 in an upper end thereof. The input region 712 is a region on which content input by a virtual keyboard is displayed. A height of the default virtual keyboard 710 including the input region 712 may be denoted by h1.

The mobile terminal 100 according to an embodiment of the present invention may resize and display a virtual keyboard according to a direction in which the mobile terminal 100 is inclined. The mobile terminal 100 may display the virtual keyboard 720 in which at least one of a plurality of keyboard regions is enlarged and other virtual keyboard regions are reduced according to the direction in which the mobile terminal 100 is inclined. The mobile terminal 100 may reduce a length of the virtual keyboard 720 by reducing a non-selected keyboard region among the plurality of keyboard regions and may arrange an input region 722 to be parallel to a left or right side of the keyboard regions rather than an upper end of the virtual keyboard 720. A height of the virtual keyboard 720 including the input region 722 may be denoted by h2.

Therefore, the mobile terminal 100 may reduce a non-selected keyboard region among the plurality of keyboard regions, thereby reducing the height h2 of the virtual keyboard 720 and may dispose the input region 722 parallel to the keyboard regions, thereby further reducing the height h2 of the virtual keyboard 720 compared to the height h1 of the default virtual keyboard 710. That is, the mobile terminal 100 may reduce a size of a virtual keyboard and may display the virtual keyboard having a reduced size.

The mobile terminal 100 may reduce a height of a virtual keyboard, thereby further securing space for displaying content other than the virtual keyboard. For example, a content screen 724 when the mobile terminal 100 displays the virtual keyboard 720 may be greater than a content screen 714 when the mobile terminal 100 displays the default virtual keyboard 710. Thus, a user may reduce input errors by using a virtual keyboard capable of having a region that is to be touched enlarged and may simultaneously see more contents through a wider content screen.

Figure 8:
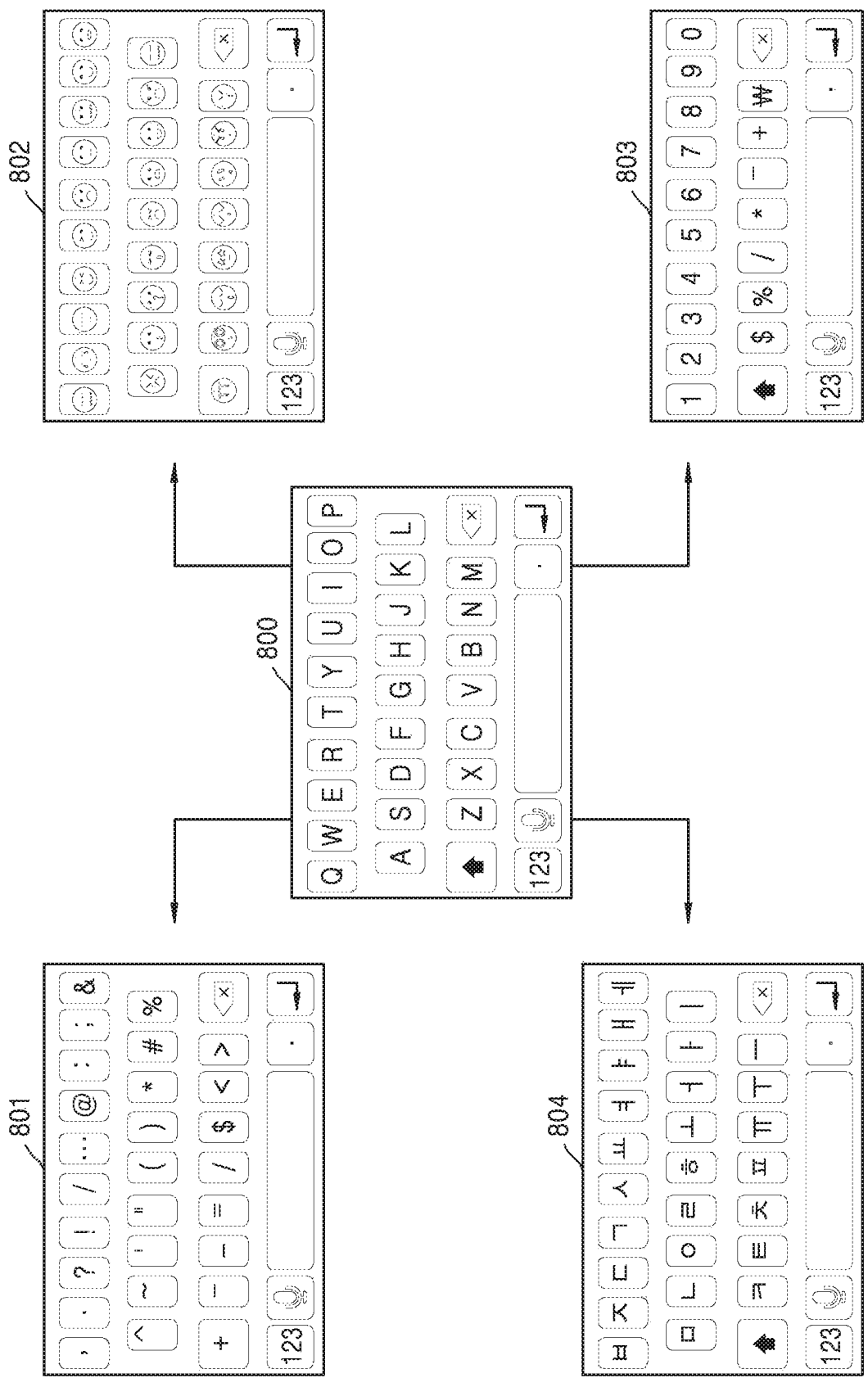
FIG. 8 is a diagram illustrating a virtual keyboard displayed by a mobile terminal according to another embodiment of the present invention.

FIG. 8 is a diagram illustrating a virtual keyboard displayed by the mobile terminal 100 according to another embodiment of the present invention.

Referring to FIG. 8, the mobile terminal 100 may display one of a plurality of virtual keyboards having different virtual keyboard modes according to a direction in which the mobile terminal 100 is inclined.

A mode of a virtual keyboard means an input type of the virtual keyboard. For example, the mobile terminal 100 may display a virtual keyboard having a character mode, a number mode, a symbol mode, or an emoticon mode. The character mode may include a Korean character mode, an English mode, etc.

The mobile terminal 100 may configure a plurality of virtual keyboard modes in correspondence to the inclination direction of the mobile terminal 100. The mobile terminal 100 may select one virtual keyboard mode corresponding to the obtained inclination direction from among the plurality of virtual keyboard modes and may display a virtual keyboard corresponding to the selected virtual keyboard mode.

For example, when the mobile terminal 100 is inclined such that a left upper end of the mobile terminal 100 rises and thus a coordinate region to which a center of mass of the mobile terminal 100 belongs is determined as a third coordinate region among a plurality of coordinate regions of FIG. 5A, the mobile terminal 100 may select the symbol mode from among the plurality of virtual keyboard modes based on the determined third coordinate region and may display a virtual keyboard corresponding to the symbol mode. The virtual keyboard corresponding to the symbol mode may be a symbol mode virtual keyboard and may include, for example, buttons "?, !, /, . . . , @, :, ;, &".

When the mobile terminal 100 is inclined such that a right upper end of the mobile terminal 100 rises and thus the coordinate region to which the center of mass of the mobile terminal 100 belongs is determined as a fourth coordinate region, the mobile terminal 100 may select the emoticon mode from among the plurality of virtual keyboard modes based on the determined fourth coordinate region and may display a virtual keyboard corresponding to the emoticon mode.

When the mobile terminal 100 is inclined such that a right lower end of the mobile terminal 100 rises and thus the coordinate region to which the center of mass of the mobile terminal 100 belongs is determined as a first coordinate region, the mobile terminal 100 may select the number mode from among the plurality of virtual keyboard modes based on the determined first coordinate region and may display a virtual keyboard corresponding to the number mode. The virtual keyboard corresponding to the number mode may be a number mode virtual keyboard and may include, for example, buttons "1, 2, 3, 4, 5, 6, 7, 8, 9, 0".

When the mobile terminal 100 is inclined such that a left lower end of the mobile terminal 100 rises and thus the coordinate region to which the center of mass of the mobile terminal 100 belongs is determined as a second coordinate region, the mobile terminal 100 may select the Korean character mode from among the plurality of virtual keyboard modes based on the determined second coordinate region and may display a virtual keyboard corresponding to the Korean character mode. The virtual keyboard corresponding to the Korean character mode may be a Korean character mode virtual keyboard When the coordinate region to which the center of mass of the mobile terminal 100 belongs is determined as a fifth coordinate region, the mobile terminal 100 may select the English mode from among the plurality of virtual keyboard modes based on the determined fifth coordinate region and may display a virtual keyboard corresponding to the English mode. The virtual keyboard corresponding to the English mode may be an English mode virtual keyboard and may include, for example, buttons "Q, W, E, R, T, Y, U, I, O, P".

Figure 9:
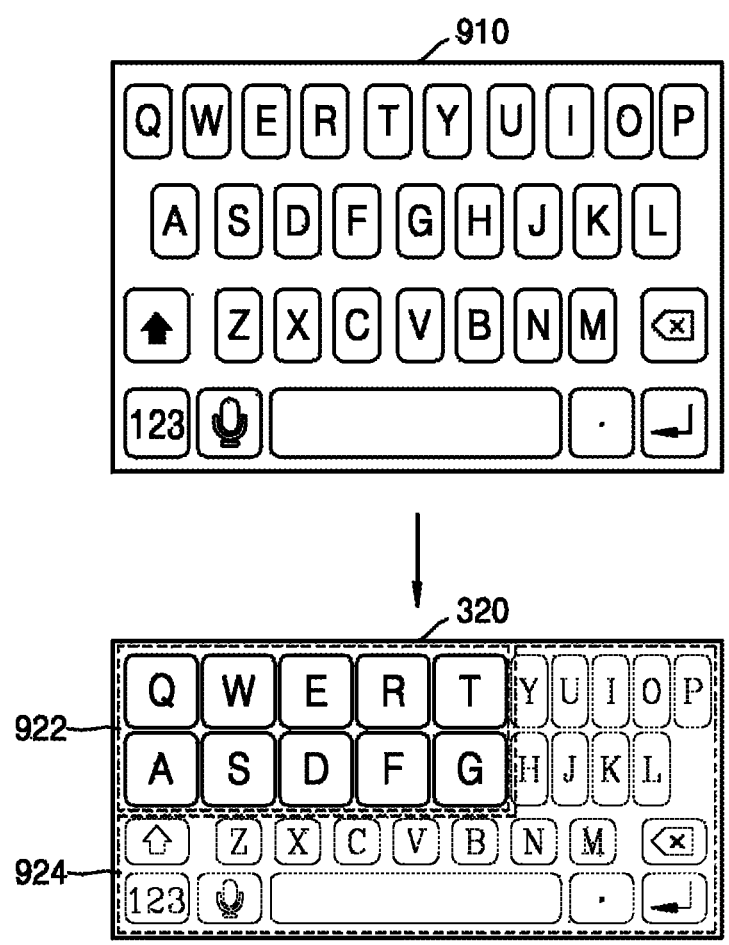
FIG. 9 is a diagram illustrating a comparison between a horizontal virtual keyboard displayed by a mobile terminal according to another embodiment of the present invention and a general horizontal virtual keyboard.

FIG. 9 is a diagram illustrating a comparison between a horizontal virtual keyboard displayed by the mobile terminal 100 according to another embodiment of the present invention and a general horizontal virtual keyboard.

Referring to FIG. 9, a virtual keyboard 910 is a default virtual keyboard, and a virtual keyboard 920 is a virtual keyboard having a modified layout when the mobile terminal 100 is inclined.

The mobile terminal 100 may differently display transparency of at least one of a plurality of keyboard regions and transparency of other keyboard regions according to a direction in which the mobile terminal 100 is inclined.

The mobile terminal 100 may also differently display a color of at least one of the plurality of keyboard regions and colors of other keyboard regions according to the direction in which the mobile terminal 100 is inclined.

More specifically, the mobile terminal 100 may select at least one of a plurality of virtual keyboard regions based on the obtained inclination direction and may differently display transparency of the selected virtual keyboard region and transparency of other non-selected virtual keyboard regions. The mobile terminal 100 may also differently display a color of the selected virtual keyboard region and colors of the other non-selected virtual keyboard regions.

For example, when the mobile terminal 100 is inclined such that a left upper end of the mobile terminal 100 rises and thus a coordinate region to which a center of mass of the mobile terminal 100 belongs is determined as a third coordinate region among a plurality of coordinate regions of FIG. 5A and thus the inclination direction is determined as a left up, the mobile terminal 100 may differently display transparency of a selected virtual keyboard region 922 and transparency of a non-selected virtual keyboard region 924 based on the determined third coordinate region. The mobile terminal 100 may also differently display a color of the selected virtual keyboard region 922 and a color of the non-selected virtual keyboard region 924.

For example, the mobile terminal 100 may display the selected first keyboard region 922 opaquely and the non-selected keyboard region 924 transparently to allow background content to be shown therethrough. Alternatively, the mobile terminal 100 may display the color of the selected first keyboard region 922 in a clear or dark manner and the color of the non-selected keyboard region 924 in a blurred manner.

For example, when the first keyboard region 922 is selected, the mobile terminal 100 may display the color of the enlarged first keyboard region 992 in a clear manner and the color of the reduced other keyboard region 924 in a blurred manner.

Figure 10:
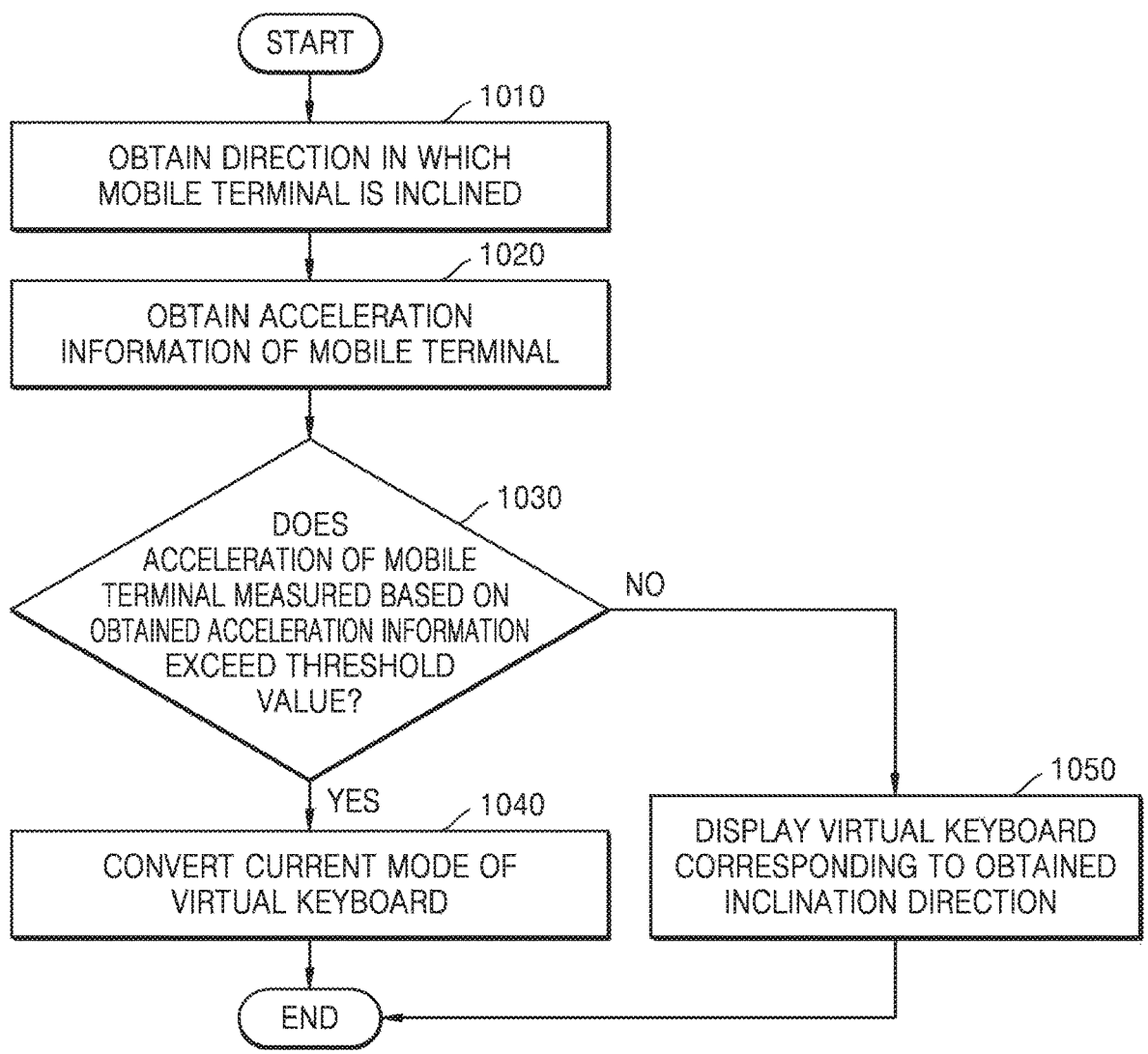
FIG. 10 illustrates a flowchart of a method in which a mobile terminal displays a virtual keyboard according to another embodiment of the present invention.

FIG. 10 illustrates a flowchart of a method in which the mobile terminal 100 displays a virtual keyboard according to another embodiment of the present invention.

Referring to FIG. 10, in operation S1010, the mobile terminal 100 may obtain a direction in which the mobile terminal 100 is inclined.

The mobile terminal 100 may obtain the inclination direction of the mobile terminal 100 by using a gravity sensor included in the mobile terminal 100. More specifically, the mobile terminal 100 may use the gravity sensor to obtain information regarding a center of mass of the mobile terminal 100 and measure the center of mass of the mobile terminal 100 and determine the inclination direction of the mobile terminal 100 based on the measured center of mass.

For example, the mobile terminal 100 may determine a coordinate region where the measured center of mass of the mobile terminal 100 in a coordinate system with an origin at a center of the mobile terminal 100 is located. The mobile terminal 100 may compare an X value and a Y value of a coordinate of the measured center of mass of the mobile terminal 100 with threshold values that are references for splitting the coordinate system to determine the coordinate region where the center of mass is located. The mobile terminal 100 may determine the inclination direction of the mobile terminal 100 in correspondence to the determined coordinate region.

The mobile terminal 100 may receive the inclination direction of the mobile terminal 100 from an external device but not limited thereto and may obtain the inclination direction of the mobile terminal 100 in real time in various ways.

In operation S1020, the mobile terminal 100 may obtain acceleration information of the mobile terminal 100.

The mobile terminal 100 may obtain the acceleration information of the mobile terminal 100 by using an acceleration sensor included in the mobile terminal 100. The mobile terminal 100 may receive the acceleration information of the mobile terminal 100 from an external device but not limited thereto and may obtain the acceleration information of the mobile terminal 100 in real time in various ways.

In operation S1030, the mobile terminal 100 may determine whether measured acceleration of the mobile terminal 100 exceeds a threshold value based on the obtained acceleration information. The threshold value of the acceleration may be preset as a default value.

In operation S1040, when the measured acceleration of the mobile terminal 100 exceeds the threshold value, the mobile terminal 100 may change a mode of a currently displayed virtual keyboard among a plurality of virtual keyboard modes to another mode.

A mode of a virtual keyboard means an input type of the virtual keyboard. For example, the mobile terminal 100 may display a virtual keyboard having a character mode, a number mode, a symbol mode, or an emoticon mode. The character mode may include a Korean character mode, an English mode, etc.

The mobile terminal 100 may configure the plurality of virtual keyboard modes in correspondence to the inclination direction of the mobile terminal 100. More specifically, the mobile terminal 100 may determine the mode of the virtual keyboard based on the measured acceleration and the obtained inclination direction and may change a current mode of the virtual keyboard to the determined mode.

For example, when the measured acceleration of the mobile terminal 100 exceeds the threshold value, and the obtained inclination direction corresponds to a third coordinate region among a plurality of coordinate regions of FIG. 5A, the mobile terminal 100 may select the symbol mode from among the plurality of virtual keyboard modes based on the third coordinate region and may change the current mode to the determined symbol mode to display a symbol mode virtual keyboard. The symbol mode virtual keyboard may include, for example, buttons "?, !, /, . . . , @, :, ;, &".

The mobile terminal 100 may select a first keyboard region based on the third coordinate region and may display the symbol mode virtual keyboard in which the selected first keyboard region is enlarged.

In operation S1050, when the measured acceleration of the mobile terminal 100 does not exceed the threshold value, the mobile terminal 100 may display the virtual keyboard of the current mode corresponding to the obtained inclination direction.

When the measured acceleration of the mobile terminal 100 does not exceed the threshold value, the mobile terminal 100 may maintain the current mode. The mobile terminal 100 may modify only a layout according to the inclination direction of the mobile terminal 100 to display the virtual keyboard of the current mode.

More specifically, the mobile terminal 100 may select at least one of the plurality of virtual keyboard regions based on the obtained inclination direction and may display the virtual keyboard of the current mode in which the selected virtual keyboard region is enlarged.

For example, when the current mode of the virtual keyboard is an English mode, the mobile terminal 100 is inclined such that a left upper end of the mobile terminal 100 rises and thus a coordinate region to which a center of mass of the mobile terminal 100 belongs is determined as a third coordinate region among a plurality of coordinate regions of FIG. 5A, the mobile terminal 100 may select the first keyboard region from among the plurality of keyboard regions based on the determined third coordinate region. In this regard, the mobile terminal 100 may display the virtual keyboard of the English mode in which the selected first keyboard region is enlarged. The mobile terminal 100 may display the virtual keyboard of the English mode including the enlarged first keyboard region.

Figure 11:
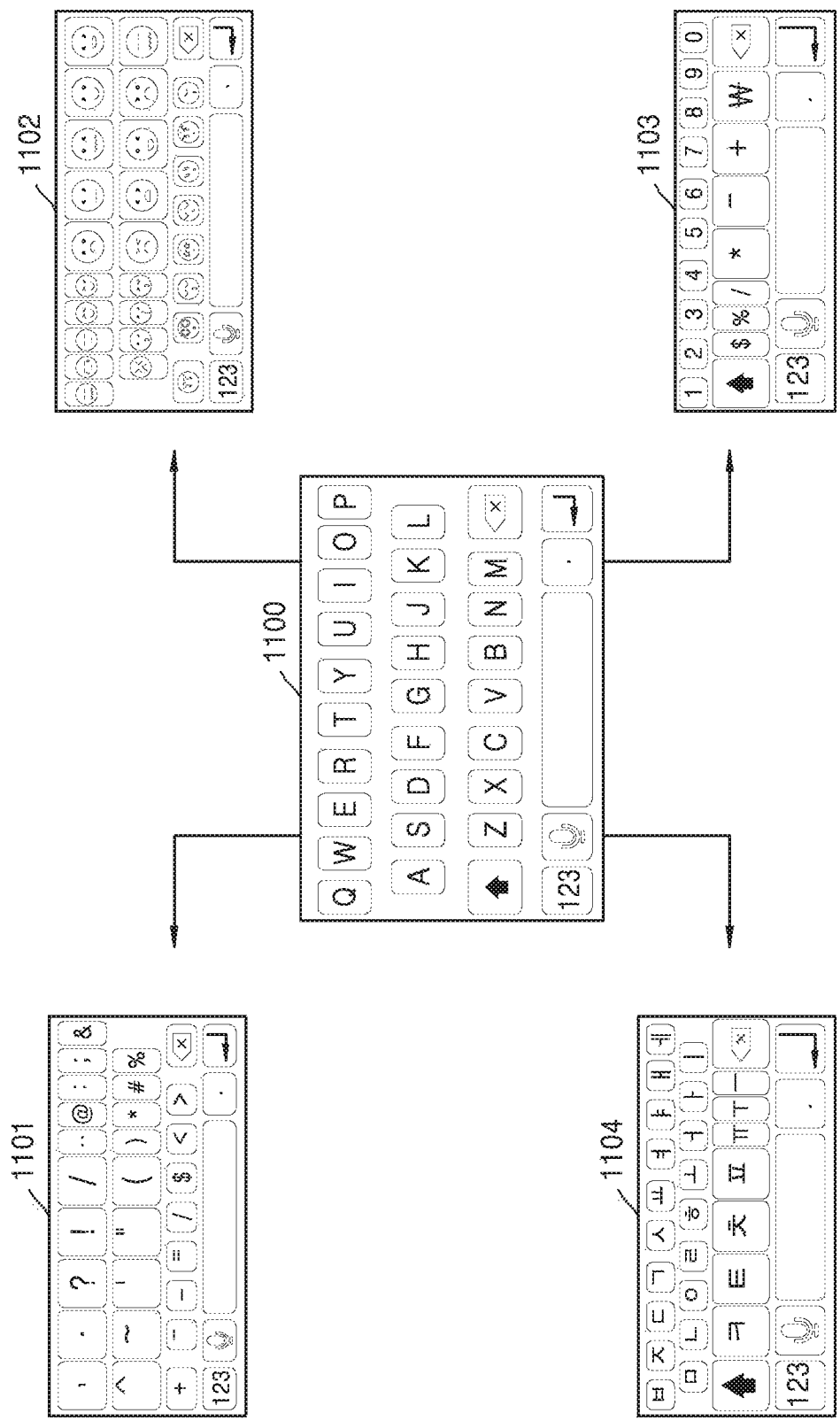
FIG. 11 is a diagram illustrating examples of a virtual keyboard when measured acceleration of the mobile terminal of FIG. 10 exceeds a threshold value in FIG. 10.

FIG. 11 is a diagram illustrating examples of a virtual keyboard when measured acceleration of the mobile terminal 100 of FIG. 10 exceeds a threshold value in FIG. 10.

The mobile terminal 100 may determine a mode of the virtual keyboard based on measured acceleration and an obtained inclination direction and may change a current mode of the virtual keyboard to the determined mode.

The mobile terminal 100 may configure a plurality of virtual keyboard modes in correspondence to the inclination direction of the mobile terminal 100. For example, the mobile terminal 100 may configure the keyboard modes such that among a plurality of coordinate regions of FIG. 5A for determining the inclination direction of the mobile terminal 100, a third coordinate region may correspond to a symbol mode, a fourth coordinate region may correspond to an emoticon mode, a first coordinate region may correspond to a number mode, a second coordinate region may correspond to a Korean character mode, and a fifth coordinate region may correspond to an English mode.

The mobile terminal 100 may determine whether measured acceleration of the mobile terminal 100 exceeds a threshold value, and, when the measured acceleration of the mobile terminal 100 exceeds the threshold value, the mobile terminal 100 may change a currently displayed virtual keyboard mode among the plurality of virtual keyboard modes to another virtual keyboard mode. When the measured acceleration of the mobile terminal 100 does not exceed the threshold value, the mobile terminal 100 may maintain the current mode. The mobile terminal 100 may modify only a layout according to the inclination direction of the mobile terminal 100 to display the virtual keyboard of the current mode.

For example, when the measured acceleration of the mobile terminal 100 exceeds the threshold value, and the obtained inclination direction corresponds to the third coordinate region, the mobile terminal 100 may select the symbol mode from among the plurality of virtual keyboard modes based on the third coordinate region and may change the current mode to the determined symbol mode to display a symbol mode virtual keyboard 1101.

The mobile terminal 100 may select the first keyboard region based on the third coordinate region and may display the symbol mode virtual keyboard 1101 in which the selected first keyboard region is enlarged.

When the measured acceleration of the mobile terminal 100 exceeds the threshold value, and the obtained inclination direction corresponds to the fourth coordinate region, the mobile terminal 100 may select the emotion mode from among the plurality of virtual keyboard modes based on the fourth coordinate region and may change the current mode to the determined emotion mode to display an emotion mode virtual keyboard 1102.

The mobile terminal 100 may select the second keyboard region based on the fourth coordinate region and may display the emotion mode virtual keyboard 1102 in which the selected second keyboard region is enlarged.

When the measured acceleration of the mobile terminal 100 exceeds the threshold value, and the obtained inclination direction corresponds to the first coordinate region, the mobile terminal 100 may select the number mode from among the plurality of virtual keyboard modes based on the first coordinate region and may change the current mode to the determined number mode to display a number mode virtual keyboard 1103.

The mobile terminal 100 may select the third keyboard region based on the first coordinate region and may display the number mode virtual keyboard 1103 in which the selected third keyboard region is enlarged.

When the measured acceleration of the mobile terminal 100 exceeds the threshold value, and the obtained inclination direction corresponds to the second coordinate region, the mobile terminal 100 may select the Korean character mode from among the plurality of virtual keyboard modes based on the first coordinate region and may change the current mode to the determined Korean character mode to display a Korean character mode virtual keyboard 1104.

The mobile terminal 100 may select the fourth keyboard region based on the second coordinate region and may display the Korean character mode virtual keyboard 1104 in which the selected fourth keyboard region is enlarged.

When the measured acceleration of the mobile terminal 100 exceeds the threshold value, and the obtained inclination direction corresponds to the fifth coordinate region, the mobile terminal 100 may select the English mode from among the plurality of virtual keyboard modes based on the fifth coordinate region and may change the current mode to the determined English mode to display an English mode virtual keyboard 1105.

The mobile terminal 100 may display an English mode virtual keyboard 1105 in which no keyboard region is enlarged based on the fifth coordinate region.

Figure 12:
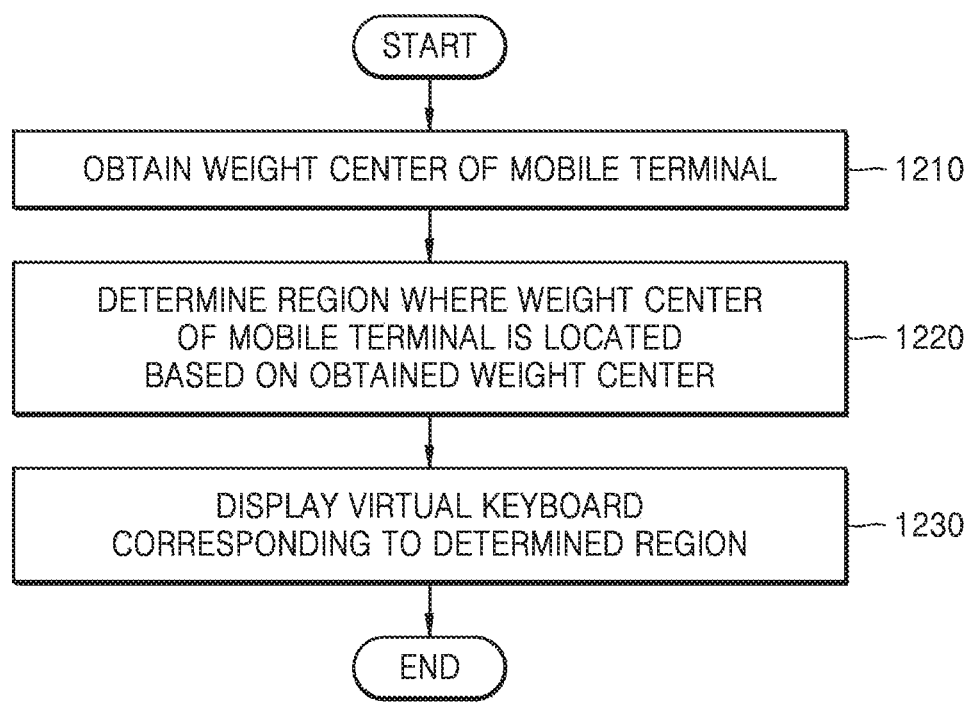
FIG. 12 illustrates a flowchart of a method in which a mobile terminal displays a virtual keyboard according to another embodiment of the present invention.

FIG. 12 illustrates a flowchart of a method in which the mobile terminal 100 displays a virtual keyboard according to another embodiment of the present invention.

Referring to FIG. 12, in operation S1210, the mobile terminal 100 may obtain a center of mass of the mobile terminal 100.

When the mobile terminal 100 is in an input status, the mobile terminal 100 may determine whether it is necessary to adjust a virtual keyboard. If the mobile terminal 100 determines that it is necessary to adjust the virtual keyboard, the mobile terminal 100 may obtain the center of mass of the mobile terminal 100. If the mobile terminal 100 determines that it is not necessary to adjust the virtual keyboard, the mobile terminal 100 may end a process.

In a specific implementation, the mobile terminal 100 may display a chat box inquiring whether to adjust the virtual keyboard. When the mobile terminal 100 receives an input instruction "Yes", the mobile terminal 100 may obtain the center of mass of the mobile terminal 100. When the mobile terminal 100 receives an input instruction "No", the mobile terminal 100 may end the process.

The mobile terminal 100 may use a gravity sensor included in the mobile terminal 100 to obtain information regarding the center of mass of the mobile terminal 100 and measure the center of mass of the mobile terminal 100. When the mobile terminal 100 is not in the input status, the mobile terminal 100 may not operate the gravity sensor and may not obtain the center of mass of the mobile terminal 100.

The mobile terminal 100 may receive the inclination direction of the mobile terminal 100 from an external device but not limited thereto and may obtain the inclination direction of the mobile terminal 100 in real time in various ways.

In operation S1220, the mobile terminal 100 may determine a region where the center of mass of the mobile terminal 100 is located based on the obtained center of mass of the mobile terminal 100.

The mobile terminal 100 may configure a coordinate system with an origin at a center of the mobile terminal 100 to split the coordinate system into a plurality of coordinate regions. The mobile terminal 100 may determine a region where the measured center of mass of the mobile terminal 100 is located in the coordinate system. The mobile terminal 100 may compare an X value and a Y value of a coordinate of the measured center of mass of the mobile terminal 100 with threshold values that are references for splitting the coordinate system to determine the coordinate region where the center of mass is located.

In operation S1230, if the region where the center of mass of the mobile terminal 100 is located is determined, the mobile terminal 100 may determine virtual keyboard information corresponding to the determined region among a plurality of pieces of virtual keyboard information and may display a virtual keyboard by using the determined virtual keyboard information. The plurality of pieces of virtual keyboard information may be information used to display the virtual keyboard and may include layout information of the virtual keyboard, color information, mode information, etc.

For example, when the mobile terminal 100 is inclined such that a left upper end of the mobile terminal 100 rises and thus the region where the measured center of mass of the mobile terminal 100 is located is determined as a third region, the mobile terminal 100 may determine first virtual keyboard information corresponding to the third region and may display the virtual keyboard by using the first virtual keyboard information. The mobile terminal 100 may use the first virtual keyboard information to display the virtual keyboard 320 in which the first keyboard region 311 is enlarged among a plurality of virtual keyboard regions of FIG. 3. The mobile terminal 100 may use the first virtual keyboard information to display the virtual keyboard 320 in which the second keyboard region 312, the third keyboard region 313, and the fourth keyboard region 314 are reduced. The mobile terminal 100 may use the first virtual keyboard information to display a virtual keyboard in which the second keyboard region 312, the third keyboard region 313, and the fourth keyboard region 314 are unlimitedly reduced and no longer appear.

The mobile terminal 100 may use the first virtual keyboard information to display a color of the first keyboard region 311 among a plurality of keyboard regions differently from colors of the other keyboard regions 312, 313, and 314.

The mobile terminal 100 may use the first virtual keyboard information to select one of a plurality of virtual keyboard modes and display a virtual keyboard of the selected mode. For example, the mobile terminal 100 may use the first virtual keyboard information to display a symbol mode virtual keyboard.

Figure 13:
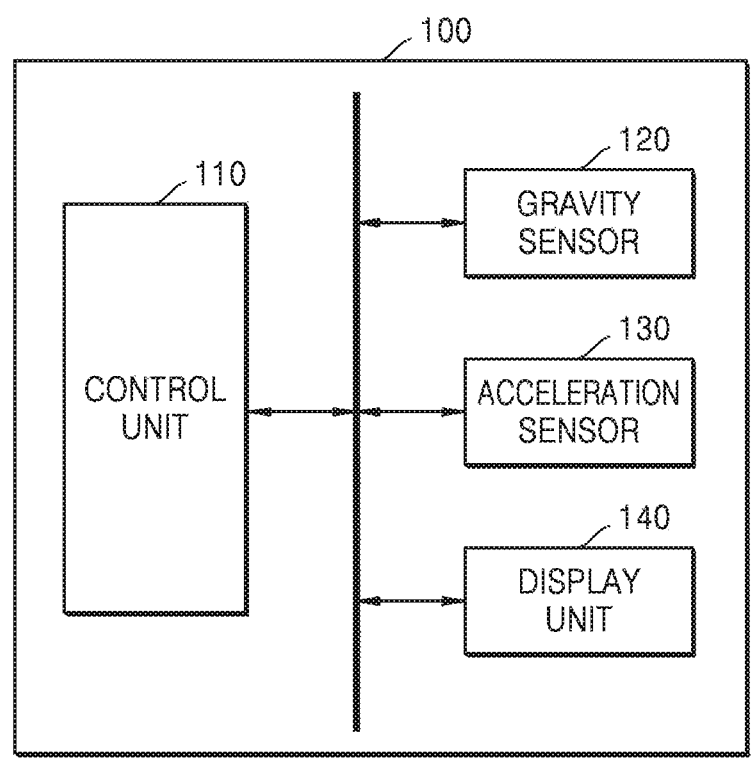
FIG. 13 is a block diagram illustrating a configuration of a mobile terminal that displays a virtual keyboard according to an embodiment of the present invention.

FIG. 13 is a block diagram illustrating a configuration of the mobile terminal 100 that displays a virtual keyboard according to an embodiment of the present invention.

Referring to FIG. 13, the mobile terminal 100 may include a controller 110, a gravity sensor 120, an acceleration sensor 130, and a display 140.

The controller 110 may be a component for controlling a general operation of the mobile terminal 100 and may include, for example, a central processing unit (CPU).

The controller 110 may obtain a direction in which the mobile terminal 100 is inclined. The controller 110 may obtain the inclination direction of the mobile terminal 100 from the gravity sensor 120.

More specifically, the controller 120 may obtain information regarding a center of mass of the mobile terminal 100 from the gravity sensor 120 to measure the center of mass of the mobile terminal 100 and determine the inclination direction of the mobile terminal 100 based on the measured center of mass.

More specifically, the controller 110 may configure a coordinate system with an origin at a center of the mobile terminal 100 to determine the direction in which the mobile terminal 100 is inclined. The controller 110 may configure the coordinate system with the origin at the center of the mobile terminal 100 to split the coordinate system into a plurality of coordinate regions and determine a coordinate region where the center of mass of the mobile terminal 100 is located among a plurality of coordinate regions. The controller 110 may determine the direction of the mobile terminal 100 in correspondence to the determined coordinate region.

The controller 110 may receive the inclination direction of the mobile terminal 100 from an external device but not limited thereto and may obtain the inclination direction of the mobile terminal 100 in real time in various ways.

The controller 110 may split a virtual keyboard that is to be displayed on the display 140 into a plurality of keyboard regions. For example, the controller 110 may split the virtual keyboard 310 of FIG. 3 into the first keyboard region 311, the second keyboard region 312, the third keyboard region 313, and the fourth keyboard region 314. The first keyboard region 311 may include buttons "Q, W, E, R, T, A, S, D, F and G". The second keyboard region 312 may include buttons "Y, U, I, O, P, G, H, J, K and L". The third keyboard region 313 may include buttons "V, B, N and M", a "right function key", and a "space bar". The fourth keyboard region 314 may include buttons "Z, X, C and V", a "left function key", and the "space bar".

The controller 110 may control the display 140 to display a virtual keyboard in which at least one of a plurality of virtual keyboard regions is enlarged according to the direction in which the mobile terminal 100 is inclined. More specifically, the controller 110 may select at least one of the plurality of virtual keyboard regions based on the obtained inclination direction and control the display 140 to display a virtual keyboard in which the selected virtual keyboard region is enlarged.

The controller 110 may control the display 140 to display a virtual keyboard in which at least one of the plurality of virtual keyboard regions is reduced according to the direction in which the mobile terminal 100 is inclined. More specifically, the controller 110 may select at least one virtual keyboard region corresponding to the obtained inclination direction from the plurality of virtual keyboard regions and may control the display 140 to display a virtual keyboard in which other non-selected virtual keyboard regions are reduced among the plurality of virtual keyboard regions.

The controller 110 may determine one of a plurality of virtual keyboard modes according to the direction in which the mobile terminal 100 is inclined and may control the display 140 to display a virtual keyboard of the determined virtual keyboard mode.

The controller 110 may control the display 140 to display a color of at least one of the plurality of keyboard regions differently from colors of other keyboard regions according to the direction in which the mobile terminal 100 is inclined.

The gravity sensor 120 may be a component for sensing a direction of gravity and obtaining the direction in which the mobile terminal 100 is inclined and may include a geo-magnetic sensor, etc.

The gravity sensor 120 may sense the direction of gravity to transmit information regarding the inclination direction of the mobile terminal 100 to the controller 110.

The acceleration sensor 130 may be a component for measuring dynamic power such as acceleration of the mobile terminal 100 or intensity of shock, etc. and may include a Gyroscope sensor, etc.

The acceleration sensor 130 may sense the acceleration of the mobile terminal 100 to transmit information regarding the sensed acceleration to the controller 110.

The display 140 may be a component for display a virtual keyboard and may be implemented as a touch screen. That is, the display 140 may be implemented as a hardware structure of the touch screen including a touch recognition module along with the display 140.

The display 140 may display the virtual keyboard determined by the controller 110.

More specifically, the display 140 may display the virtual keyboard corresponding to the obtained inclination direction of the mobile terminal 100. The display 140 may display a virtual keyboard in which a virtual keyboard region selected by the controller 110 is enlarged. The display 140 may display a virtual keyboard in which other non-selected virtual keyboard regions are reduced among the plurality of virtual keyboard regions. The display 140 may differently display a color of the virtual keyboard region selected by the controller 110 and colors of the other non-selected virtual keyboard regions.

The display 140 may display a virtual keyboard corresponding to a mode of the virtual keyboard determined by the controller 110.

The method described above may be implemented as an executable program, and may be executed by a general-purpose digital computer that runs the program by using a computer-readable recording medium. Also, a structure of data used in the embodiments described above may be recorded by using various units on a computer-readable medium. Examples of the non-transitory computer-readable medium include storage media such as magnetic storage media (e.g., read only memories (ROMs), floppy discs, or hard discs), optically readable media (e.g., compact disk-read only memories (CD-ROMs), or digital versatile disks (DVDs)), etc.

It will be understood by those skilled in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method comprising:
   obtaining a direction in which a mobile terminal is inclined;
   obtaining acceleration information of the mobile terminal;
   determining a mode of a virtual keyboard based on the acceleration information of the mobile terminal and the direction the mobile terminal is inclined; and
   displaying a modified virtual keyboard based on the mode of the virtual keyboard,
   wherein the virtual keyboard of the mobile terminal comprises a plurality of virtual keyboard regions,
   wherein the displaying of the modified virtual keyboard based on the mode of the virtual keyboard comprises:
   in response to obtaining the direction in which the mobile terminal is inclined, selecting at least one of the plurality of virtual keyboard regions to be enlarged and determining other virtual keyboard regions to be reduced based on the direction the mobile terminal is inclined, and
   displaying the modified virtual keyboard in which the at least one of the plurality of virtual keyboard regions is enlarged and the other virtual keyboard regions are reduced, and
   wherein the at least one of the plurality of virtual keyboard regions that is enlarged comprises a keyboard region that is located adjacent to a corner of the virtual keyboard.

2. The method of claim 1, wherein the displaying of the modified virtual keyboard further comprises resizing the virtual keyboard based on the direction the mobile terminal is inclined.

3. The method of claim 1, wherein the displaying of the modified virtual keyboard further comprises differently displaying a transparency of the at least one of the plurality of virtual keyboard regions that is enlarged and a transparency of the other virtual keyboard regions that are reduced based on the direction the mobile terminal is inclined.

4. The method of claim 1, wherein the displaying of the modified virtual keyboard further comprises differently displaying a color of the at least one of the plurality of virtual keyboard regions that is enlarged and colors of the other virtual keyboard regions that are reduced based on the direction the mobile terminal is inclined.

5. The method of claim 1, wherein the determining of the mode of the virtual keyboard comprises:
   determining whether an acceleration of the mobile terminal that is measured based on the acceleration information exceeds a threshold value; and
   when the acceleration of the mobile terminal exceeds the threshold value, changing a current mode of the virtual keyboard.

6. The method of claim 5, wherein the changing of the current mode of the virtual keyboard comprises determining the mode of the virtual keyboard based on the acceleration of the mobile terminal and the direction the mobile terminal is inclined.

7. The method of claim 1, wherein the displaying of the modified virtual keyboard comprises selecting and displaying one of a plurality of virtual keyboards having different input modes according to the determined mode of the virtual keyboard.

8. The method of claim 1, wherein the obtaining of the direction in which the mobile terminal is inclined comprises:
   obtaining information about a center of mass of the mobile terminal by using a gravity sensor;
   determining a region where the center of mass of the mobile terminal is located based on the information about the center of mass; and
   determining the direction the mobile terminal is inclined in correspondence to the determined region.

9. A mobile terminal comprising:
   a controller configured to obtain a direction in which the mobile terminal is inclined;
   an acceleration sensor configured to obtain acceleration information of the mobile terminal, wherein the controller is further configured to determine a mode of a virtual keyboard based on the acceleration information of the mobile terminal and the direction the mobile terminal is inclined; and
   a display configured to display a modified virtual keyboard based on the mode of the virtual keyboard,
   wherein the virtual keyboard of the mobile terminal comprises a plurality of virtual keyboard regions,
   wherein the controller is further configured to, in response to obtaining the direction in which the mobile terminal is inclined, select at least one of the plurality of virtual keyboard regions to be enlarged and determine other virtual keyboard regions to be reduced based on the direction the mobile terminal is inclined,
   wherein the display is further configured to display the modified virtual keyboard in which the at least one of the plurality of virtual keyboard regions is enlarged and the other virtual keyboard regions are reduced, and
   wherein the at least one of the plurality of virtual keyboard regions that is enlarged comprises a keyboard region that is located adjacent to a corner of the virtual keyboard.

10. The mobile terminal of claim 9, wherein the display is further configured to resize the virtual keyboard based on the direction the mobile terminal is inclined.

11. The mobile terminal of claim 9, wherein the display is further configured to differently display a transparency of the at least one of the plurality of virtual keyboard regions that is enlarged and transparencies of the other virtual keyboard regions that are reduced based on the direction the mobile terminal is inclined.

12. The mobile terminal of claim 9, wherein the display is further configured to differently display a color of the at least one of the plurality of virtual keyboard regions that is enlarged and colors of the other virtual keyboard regions that are reduced based on the direction the mobile terminal is inclined.

13. The mobile terminal of claim 9, wherein the controller is further configured to:
   determine whether an acceleration of the mobile terminal that is measured based on the acceleration information exceeds a threshold value, and
   when the acceleration of the mobile terminal exceeds the threshold value, change a current mode of the virtual keyboard.

14. The mobile terminal of claim 9, wherein the display is further configured to select and display one of a plurality of virtual keyboards having different input modes according to the determined mode of the virtual keyboard.

15. The mobile terminal of claim 9, further comprising:
   a gravity sensor configured to obtain information about a center of mass of the mobile terminal,
   wherein the controller is further configured to:
      determine a region where the center of mass of the mobile terminal is located based on the information about the center of mass, and
      determine the direction the mobile terminal is inclined in correspondence to the determined region.

16. A non-transitory computer-readable recording medium having recorded thereon a computer program for executing a method, the method comprising:
   obtaining a direction in which a mobile terminal is inclined;
   obtaining acceleration information of the mobile terminal;
   determining a mode of a virtual keyboard based on the acceleration information of the mobile terminal and the direction the mobile terminal is inclined; and
   displaying a modified virtual keyboard based on the mode of the virtual keyboard,
   wherein the virtual keyboard of the mobile terminal comprises a plurality of virtual keyboard regions,
   wherein the displaying of the modified virtual keyboard based on the mode of the virtual keyboard comprises:
      in response to obtaining the direction in which the mobile terminal is inclined, selecting at least one of the plurality of virtual keyboard regions to be enlarged and determining other virtual keyboard regions to be reduced based on the direction the mobile terminal is inclined, and
      displaying the modified virtual keyboard in which the at least one of the plurality of virtual keyboard regions is enlarged and the other virtual keyboard regions are reduced, and
   wherein the at least one of the plurality of virtual keyboard regions that is enlarged comprises a keyboard region that is located adjacent to a corner of the virtual keyboard.

17. The method of claim 1, wherein the other virtual keyboard regions that are reduced are substantially located in remaining corners of the virtual keyboard.

18. The method of claim 1,
   wherein each of the other virtual keyboard regions has an area smaller than an area of the at least one of the plurality of keyboard regions that is enlarged, and
   wherein areas of at least two of the other virtual keyboard regions that are reduced are different.

* * * * *